US010767005B2

(12) United States Patent
Mondschein et al.

(10) Patent No.: US 10,767,005 B2
(45) Date of Patent: Sep. 8, 2020

(54) BIBENZOATE COPOLYESTERS AND METHODS TO PRODUCE THEM

(71) Applicants: ExxonMobil Chemical Patents Inc., Baytown, TX (US); Virginia Tech Intellectual Properties, Inc., Blacksburg, VA (US)

(72) Inventors: Ryan J. Mondschein, Blacksburg, VA (US); Haoyu Liu, Midlothian, VA (US); Ting Chen, Friendswood, TX (US); Timothy E. Long, Blacksburg, VA (US); S. Richard Turner, Blacksburg, VA (US)

(73) Assignees: ExxonMobil Chemical Patents Inc., Baytown, TX (US); Virginia Tech Intellectual Properties, Inc, Blacksburg, VA (US)

( * ) Notice: Subject to any disclaimer, the term of this patent is extended or adjusted under 35 U.S.C. 154(b) by 0 days.

(21) Appl. No.: 15/571,025

(22) PCT Filed: Oct. 7, 2016

(86) PCT No.: PCT/US2016/056124
§ 371 (c)(1),
(2) Date: Oct. 31, 2017

(87) PCT Pub. No.: WO2018/067181
PCT Pub. Date: Apr. 12, 2018

(65) Prior Publication Data
US 2018/0282475 A1    Oct. 4, 2018

Related U.S. Application Data

(60) Provisional application No. 62/271,036, filed on Dec. 22, 2015.

(51) Int. Cl.
| | | |
|---|---|---|
| *C08G 63/185* | (2006.01) | |
| *C08G 63/83* | (2006.01) | |
| *C08J 5/00* | (2006.01) | |
| *C08J 5/18* | (2006.01) | |
| *C08G 63/85* | (2006.01) | |

(52) U.S. Cl.
CPC .......... *C08G 63/185* (2013.01); *C08G 63/83* (2013.01); *C08G 63/85* (2013.01); *C08J 5/00* (2013.01); *C08J 5/18* (2013.01); *C08J 2367/02* (2013.01)

(58) Field of Classification Search
CPC ...... C08G 63/185; C08G 63/83; C08G 63/85; C08G 63/199; C08G 63/20; C08J 2367/02; C08J 5/00; C08J 5/18
See application file for complete search history.

(56) References Cited

U.S. PATENT DOCUMENTS

| | | | |
|---|---|---|---|
| 2,976,266 A | 3/1961 | Lytton et al. | |
| 3,008,934 A | 11/1961 | Wielicki et al. | |
| 3,502,620 A * | 3/1970 | Caldwell | C08G 63/02 |
| | | | 525/437 |
| 4,082,731 A | 4/1978 | Knopka | |
| 4,914,179 A | 4/1990 | Morris et al. | |
| 4,916,205 A | 4/1990 | Morris et al. | |
| 4,947,479 A | 8/1990 | Kawai et al. | |
| 4,956,448 A | 9/1990 | Morris et al. | |
| 4,959,450 A | 9/1990 | Morris et al. | |
| 4,973,654 A | 11/1990 | Morris et al. | |
| 5,011,877 A | 4/1991 | Morris et al. | |
| 5,011,878 A | 4/1991 | Morris et al. | |
| 5,037,946 A | 8/1991 | Morris et al. | |
| 5,037,947 A | 8/1991 | Morris et al. | |
| 5,045,610 A | 9/1991 | Bales et al. | |
| 5,057,595 A | 10/1991 | Morris et al. | |
| 5,081,220 A | 1/1992 | Morris et al. | |
| 5,138,022 A | 8/1992 | Mang et al. | |
| 8,586,652 B2 | 11/2013 | Williams et al. | |
| 2006/0229430 A1 | 10/2006 | Turner et al. | |
| 2011/0081510 A1 | 4/2011 | Shih et al. | |

FOREIGN PATENT DOCUMENTS

| | | |
|---|---|---|
| DE | 19691935252 | 1/1971 |
| JP | 57/198726 | 12/1982 |
| WO | 1990/07553 | 7/1990 |
| WO | 2015/112252 | 7/2015 |
| WO | 2017/112031 | 6/2017 |

OTHER PUBLICATIONS

Turner et al "Cyclohexanedimethanol Polyesters" Encyclopedia of Polymer Science and Technology, V.2; pp. 127-134 (Year: 2001).*
McKee et al "Branched polyesters: recent advances in synthesis and performance", Prog. Polym. Sci. 30 (2005) 507-539 (Year: 2005).*
PCT/US2016/056124 ISR and WO; Jan. 6, 2017.

(Continued)

*Primary Examiner* — Ling Siu Choi
*Assistant Examiner* — Gennadiy Mesh
(74) *Attorney, Agent, or Firm* — Daniel N. Lundeen; Lundeen & Lundeen PLLC

(57) ABSTRACT

Bibenzoate copolyesters are based on (4,4'-biphenyl dicarboxylic acid-co-3,4'-biphenyl dicarboxylic acid) as the diacid component, and on an alicyclic diol compound such as 1,4-cyclohexanedimethanol as a portion of the diol component. Copolyesters are based on 4,4'-biphenyl dicarboxylic acid, and/or 3,4'-biphenyl dicarboxylic acid as the diacid component and may include a multifunctional acid. Copolymers may optionally base an essentially amorphous morphology, high glass transition temperature, high elongation at break, and/or high melting temperature. A method to make the copolymers controls the characteristics of the copolyester selected from one or a combination of amorphous morphology or degree of crystallinity, Tg, Tm, tensile modulus, flexural modulus, elongation at break, and so on, by selecting the proportions of the 4,4'-biphenyl dicarboxylic acid or ester producing equivalent thereof, 3,4'-biphenyl dicarboxylic acid or ester producing equivalent thereof, and/or the proportion of the 1,4-cyclohexanedimethanol in the diol component.

32 Claims, 7 Drawing Sheets

(56) References Cited

OTHER PUBLICATIONS

Tokita, Masatoshi et al., Several Interesting Fields Exploited through Understanding of Polymeric Effects on Liquid Crystals of Main-Chain Polyesters, Polymer Journal, vol. 38, No. 7, p. 311-638, 2006.
Polyakova, A. et al., Oxygen-Barrier Properties of Copolymers Based on Ethylene Terephthalate, Journal of Polymer Science: Part B: Polymer Physics, vol. 39, p. 1889-1899, 2001.
Nelson, Ashley and Long, Timothy E., A Perspective on Emerging Polymer Technologies for Bisphenol-A Replacement, Polym Int, vol. 61, p. 1485-1491, 2012.
PCT/US2016/56158, ISR and WO; Dec. 27, 2016.
Tingting Chen et al., Poly(ethylene glycol-co-1,4-cyclohexanedimenthol terephthalate) random copolymers: effect of copolymer composition and microstructure on the thermal properties and crystallization behavior, RSC Advances, vol. 5, No. 74, Jan. 1, 2015, pp. 60570-60580.

* cited by examiner

BIBENZOATE COPOLYESTERS AND METHODS TO PRODUCE THEM

BACKGROUND

Polyesters based on diols and aromatic diacids, often called aromatic polyesters, are used in many industrial applications due to their low cost of production, easy processing, good barrier properties, and strong thermal and mechanical performances. Poly(ethylene terephthalate) (PET), poly(ethylene naphthalate) (PEN) and poly(1,4-cyclohexylenedimethylene terephthalate) (PCT), as well as PET modified with less than 50 mol % of 1,4-cyclohexanedimethanol (CHDM or, as polymerized, 1,4-cyclohexylenedimethylene) (PETG) and PCT modified with less than 50 mol % ethylene glycol (PCTG) are examples of such polyesters. Amorphous versus semicrystalline morphology, glass transition temperature, crystallization temperature, melting temperature, melt stability heat distortion temperature, tensile and flexural strength, tensile and flexural moduli, and extension to break, are examples of important properties.

Copolymers of 4,4'-biphenyl dicarboxylic acid and 3,4'-biphenyl dicarboxylic acid with a diol such as ethylene glycol are known from U.S. Pat. No. 5,138,022 and WO 2015/112252. A semicrystalline copolyester is obtained when the 4,4'-biphenyl dicarboxylic acid content is 50 mole percent or more. These semicrystalline copolyesters usually have lower glass transition temperatures than desired and/or poor tensile properties such as toughness for particular applications, and in addition have melting temperatures higher than desired for processing. When more 4,4'-biphenyl dicarboxylic acid is incorporated to improve tensile or other properties, the melting temperature is further increased.

The amorphous copolyesters of 4,4'-biphenyl dicarboxylic acid and 3,4'-biphenyl dicarboxylic acid with ethylene glycol generally incorporate more of the 3,4'-biphenyl dicarboxylic acid isomer, and can have undesirably low glass transition temperatures and/or poor tensile properties such as toughness. When more 4,4'-biphenyl dicarboxylic acid is incorporated in an effort to elevate the glass transition temperature or improve other properties, the copolyester becomes semicrystalline.

The industry thus has one or more of the following needs: to improve control over the morphology of the 4,4'-biphenyl dicarboxylic acid and 3,4'-biphenyl dicarboxylic acid copolyesters and or improve the properties of the copolyester due to an increase in the amount of 4,4'-biphenyl dicarboxylic acid that can be used in the amorphous copolyester; to lower the melting temperature of the semicrystalline copolyesters; to increase the glass transition temperature of the amorphous or semicrystalline copolyesters; and/or to improve the tensile or other properties of the amorphous or semicrystalline copolyesters.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In accordance with embodiments of the invention, a copolyester comprises a diol component comprising an aliphatic diol, such as an alkylene diol selected from ethylene glycol, 1,3-propanediol, 1,4-butanediol, 1,6-hexanediol, neopentyl glycol or a combination thereof, and an alicyclic polyhydroxyl compound, such as 1,4-cyclohexanedimethanol; and a diacid component comprising 4,4'-biphenyl dicarboxylate and 3,4'-biphenyl dicarboxylate. In embodiments, a copolyester comprises one or more diacid components in ester linkage with one or more diol components, the diol components comprising an alkylene diol and an alicyclic polyhydroxyl compound; and the diacid component derived from 4,4'-biphenyl dicarboxylate, and 3,4'-biphenyl dicarboxylic dicarboxylate.

In accordance with some embodiments of the invention, a copolyester comprises: an essentially amorphous morphology, a diol component comprising from about 10 to 90 mole percent 1,4-cyclohexanedimethanol and from about 10 to 90 mole percent of an alkylene diol selected from ethylene glycol, 1,3-propanediol, 1,4-butanediol, 1,6-hexanediol, neopentyl glycol or a combination thereof, preferably ethylene glycol, preferably from about 20 to 80 mole percent 1,4-cyclohexanedimethanol and from about 20 to 80 mole percent of the alkylene diol selected from ethylene glycol, 1,3-propanediol, 1,4-butanediol, 1,6-hexanediol, neopentyl glycol or a combination thereof, preferably ethylene glycol, based on the total moles of the diol component in the copolyester; a diacid component comprising from about 10 to 90 mole percent of 4,4'-biphenyl dicarboxylate and from about 70 to 20 mole percent of 3,4'-biphenyl dicarboxylate, preferably from about 30 to 80 mole percent of 4,4'-biphenyl dicarboxylate and from about 70 to 20 mole percent of 3,4'-biphenyl dicarboxylate, based on the total moles of the diacid component in the copolyester; optionally from about 0.001 to 1 mole percent of a branching agent (such as, e.g., trimellitic or pyromellitic anhydride), preferably from about 0.01 to 0.3 mole percent trimellitic or pyromellitic anhydride, based on the total moles of repeating units in the copolyester, and a glass transition temperature equal to or greater than about 100° C., preferably equal to or greater than about 105° C., or equal to or greater than about 110° C., determined by differential scanning calorimetry (DSC) analysis from a second heating ramp in a heating rate of 10° C./min. In accordance with some embodiments of the invention, a copolyester comprises: a semicrystalline morphology; a diol component comprising from about 20 to 80 mole percent 1,4-cyclohexanedimethanol and from about 10 to 90 mole percent of an alkylene diol selected from ethylene glycol, 1,3-propanediol, 1,4-butanediol, 1,6-hexanediol, neopentyl glycol or a combination thereof, preferably ethylene glycol, based on the total moles of the diol component in the copolyester; a diacid component comprising from about 60 to 90 mole percent of 4,4'-biphenyl dicarboxylate, and from about 40 to 10 mole percent of 3,4' biphenyl dicarboxylate, based on the total moles of the diacid component in the copolyester, a melting temperature less than or equal to about 280° C. determined by DSC analysis from a second heating ramp at a heating rate of 10° C./min; and a glass transition temperature equal to or greater than about 120° C. determined by DSC analysis from a second heating ramp at a heating rate of 10° C./min.

In accordance with any of the embodiments herein, the amorphous or semicrystalline copolyesters comprise one or more of the properties selected from an elongation at break greater than about 85 percent determined according to ASTM D638; a tensile strength of equal to or greater than about 60 MPa determined according to ASTM D638; a tensile modulus of equal to or greater than about 1700 MPa determined according to ASTM D638; a flexural strength of equal to or greater than about 80 MPa determined according to ASTM D790; a flexural modulus of equal to or greater than about 2500 MPa determined according to ASTM D790, a heat distortion temperature at 455 kPa of equal to or greater than about 90° C. determined according to ASTM D648; and/or a heat distortion temperature at 1.82 MPa of equal to or greater than about 70° C. determined according to ASTM D648.

In accordance with some embodiments of the invention, a method comprises contacting a diol component comprising 1,4-cyclohexanedimethanol and alkylene diol selected from ethylene glycol 1,3-propanediol, 1,4-butanediol, 1,6-hexanediol, neopentyl glycol or a combination thereof, with a diacid component comprising 4,4'-biphenyl dicarboxylic acid or ester producing equivalent thereof and 3,4'-biphenyl dicarboxylic add or ester producing equivalent thereof in the presence of a catalyst; and forming a copolyester comprising the alkylene diol, 1,4-cyclohexanedimethanol, 4,4-biphenyl dicarboxylic acid and 3,4'-biphenyl dicarboxylic acid.

In accordance with embodiments of the invention, a method to control the morphology, glass transition temperature, melting temperature and/or roughness of a copolyester, comprises contacting (i) a diacid component comprising from about 10 to 90 mole percent 4,4'-biphenyl dicarboxylic acid or ester producing equivalent thereof and from about 10 to 90 mole percent 3,4'-biphenyl dicarboxylic acid or ester producing equivalent thereof, preferably from about 50 to 90 mole percent 4,4'-biphenyl dicarboxylic acid or ester producing equivalent thereof and from about 10 to 50 mole percent 3,4'-biphenyl dicarboxylic acid or ester producing equivalent thereof, based on the total moles of the diacid component in the copolyester, with (ii) a diol component comprising from 10 to 90 mole percent 1,4-cyclohexanedimethanol, based on the total moles of the diol component in the copolyester, and (iii) optionally a multifunctional branching agent, e.g., a multifunctional carboxylic acid or ester producing equivalent thereof, preferably a trifunctional carboxylic acid or ester producing equivalent thereof, in the presence of (iv) a catalyst; and selecting a proportion of the 1,4-cyclohexanedimethanol in the diol component, a proportion, of the 4,4'-biphenyl dicarboxylic acid or ester producing equivalent thereof in the diacid component, and a proportion of the multifunctional branching agent in total repeating units, to produce a copolyester comprising: an essentially amorphous or a semicrystalline morphology; a glass transition temperature within a selected range equal to or greater than about 100° C., preferably equal to or greater than about 105° C., or equal to or greater than about 100° C., determined by differential scanning calorimetry (DSC) analysis from a second heating ramp at a heating rate of 10° C./min; and where the morphology is semicrystalline, a melting temperature less than about 280° C., preferably a melting temperature less than about 250° C., determined by DSC analysis from a second heating ramp at a heating rate of 10° C./min.

DETAILED DESCRIPTION

Figure 1:
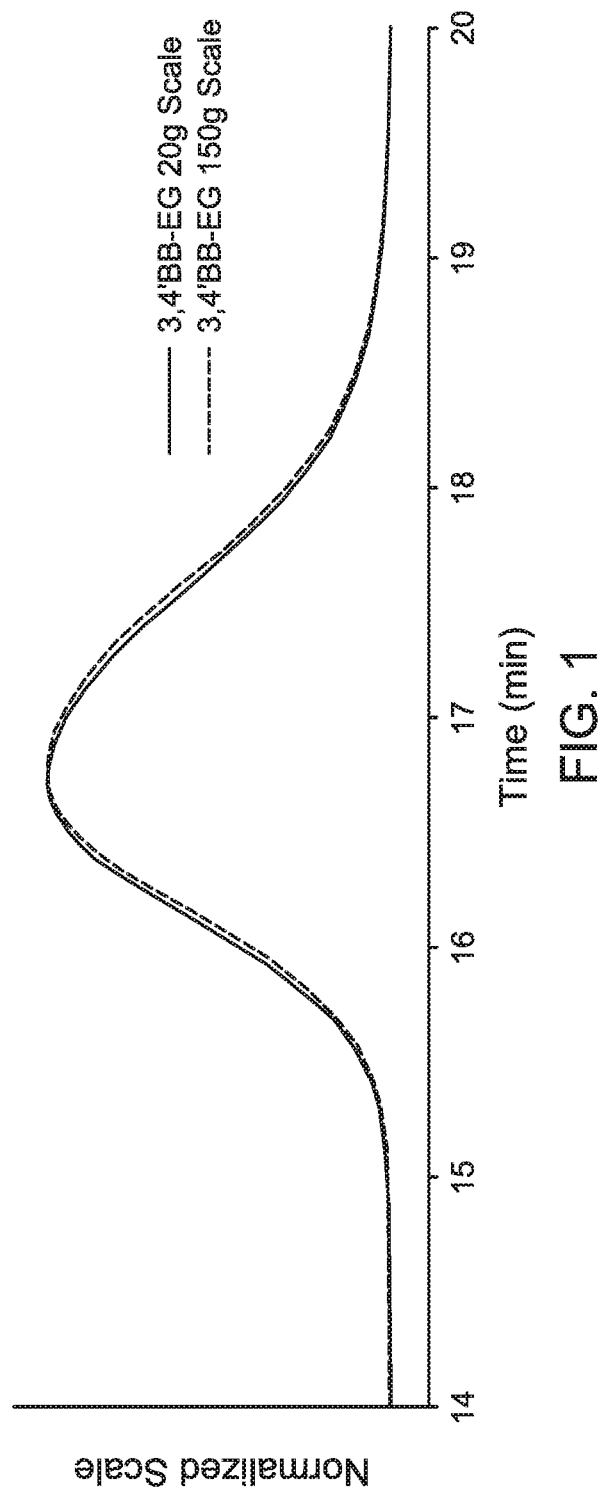
FIG. 1 is a plot of intensity from a refractive index detector as a function of time obtained by gel phase chromatography (GPC) in THF indicative of the molecular weight, comparing copolyesters having the same composition of monomers produced on different production scales according to embodiments of the invention.

Throughout the entire specification, including the claims, the following terms shall have the indicated meanings.

The term "and/or" refers to both the inclusive "and" case and the exclusive "or" case, whereas the term "and or" refers to the inclusive "and" case only; such terms are used herein for brevity. For example, a composition comprising "A and/or B" may comprise A alone, B alone, or both A and B; and a composition comprising "A and or B" may comprise A alone, or both A and B.

The percentages of monomers are expressed herein as mole percent (mol %) based on the total moles of monomers present in the reference polymer or polymer component. All other percentages are expressed, as weight percent (wt %), based on the total weight of the particular composition present, unless otherwise noted. Room temperature is 25° C.±2° C. and atmospheric pressure is 101.325 kPa unless otherwise noted.

The term "consisting essentially of" in reference to a composition is understood to mean that the composition can include additional compounds other than those specified, in such amounts to the extent that they do not substantially interfere with the essential function of the composition, or if no essential function is indicated, in any amount up to 5 percent by weight of the composition.

For purposes herein a "polymer" refers to a compound having two or more "mer" units (see below for polyester mer units), that is, a degree of polymerization of two or more, where the mer units can be of the same or different species. A "homopolymer" is a polymer having mer units or residues that are the same species. A "copolymer" is a polymer having two or more different species of mer units or residues. A "terpolymer" is a polymer having three different species of mer units. "Different" in reference to mer unit species indicates that the mer units differ from each other by at least one atom or are different isomerically. Unless otherwise indicated, reference to a polymer herein includes a copolymer, a terpolymer, or any polymer comprising a plurality of the same or different species of repeating units.

The term "polyester", as used herein, refers to a polymer comprised of residues derived from one or more polyfunctional acid moieties, collectively referred to herein as the "diacid component", in ester linkage with residues derived from one or more polyhydroxyl compounds, which may also be referred to herein as "polyols" and collectively as the "diol component". The term "repeating unit", also referred to as the "mer" units, as used herein with reference to polyesters refers to an organic structure having a diacid component residue and a diol component residue bonded through a carbonyloxy group, i.e., an ester linkage. Reference to the equivalent terms "copolyesters" or "(co)polyesters" or "polyester copolymers" herein is to be understood to mean a polymer prepared by the reaction of two or more different diacid compounds or ester producing equivalents thereof that incorporate different diacid residues into the backbone, and/or two or more different diol compounds that incorporate different diol residues into the backbone, i.e., either one or both of the diacid and diol components incorporate a combination of different species into the polymer backbone.

As used herein, the prefixes di- and tri- generally refer to two and three, respectively, with the exception of diacid and diol components noted herein. Similarly, the prefix "poly-" generally refers to two or more, and the prefix "multi-" to three or more. The carboxylic acids and/or esters used to make the copolyesters, or the residues of which ape present therein, are collectively referred to herein as the "diacid component", including both difunctional and multifunctional species thereof, or simply as the "acid component"; and likewise the hydroxyl compounds used to make the copolyesters, or the residues of which are present therein, are collectively referred to herein as the "diol component", including both difunctional and multifunctional species thereof, or simply as the hydroxyl or polyol component.

The polycarboxylic acid residues, e.g., the dicarboxylate mer units, may be derived from a polyfunctional acid monomer or an ester producing equivalent thereof. Examples of ester producing equivalents of polyfunctional acids include one or more corresponding acid halide(s), ester(s), salts, the anhydride, or mixtures thereof. As used herein, therefore, the term "diacid" is intended to include polycarboxylic acids and any derivative of a polycarboxylic acid, including its associated acid halide, esters, half-esters, salts, half-salts, anhydrides, mixed anhydrides, or mixtures thereof, capable of forming esters useful in a reaction process with a diol to make polyesters.

As used herein, a "branching agent" is a multifunctional compound e.g., a multifunction carboxylic acid, that causes or promotes the formation of branches in the growth of the polyester chain. A branching agent can be, for example, either a multifunctional hydroxyl component or a multifunctional acid component, or comprise a mixture of functionalities. Multifunctional hydroxyl component branching agents can include, for example, triols such as glycerol, trimethylolpropane, ditrimethylol propane, trimethylolethane, pentaerythrytol, dipentaerythrytol, glycerol and so on. Multifunctional acid component branching agents can include, for example, trimellitic and/or pyromellitic anhydrides or acids, etc. and their esters and ester producing equivalents thereof, and the like, in which the anhydride functional group(s)) reacts to form two carboxylic acid groups. Furthermore, the term "branching agent" may include multifunctional compounds having a total number of mixed carboxylic acid and/or hydroxyl groups of three or more, e.g., two acid groups and one hydroxyl group, or one acid group and two hydroxyl groups, etc.

The term "residue", as used herein, means the organic structure of the monomer in its as-polymerized form as incorporated into a polymer, e.g., through a polycondensation and/or an esterification or transesterification reaction from the corresponding monomer. Throughout the specification and claims, reference to the monomer(s) in the polymer is understood to mean the corresponding as-polymerized form or residue of the respective monomer. For purposes herein, it is to be understood that by reference to a copolyester comprising a diacid component and a diol component, the diacid and diol components are present in the polymer in the as-polymerized (as-condensed) form. For example, the diacid component is present in the polymer as dicarboxylate in alternating ester linkage with the diol component, yet the polyester may be described as being comprised of, for example, the dicarboxylic acid alkyl ester and diol where it is understood the alkyl ester groups in the starting material are not present in the polyester, for example, the diacid component is present in the polymer in alternating ester linkage with the diol component, yet the polyester may be described as being comprised of, for example, the dicarboxylic acid, or dicarboxylic acid alkyl ester and diol, e.g., terephthalic acid-ethylene glycol polyester or dimethylterephthalate-ethylene glycol polyester, where it is understood the acid or methyl ester groups in the starting material are not present in the polyester.

Mole percentages of the diacid and diol components are expressed herein based on the total moles of the respective component, i.e., the copolyesters comprise 100 mole percent of the polyfunctional acid component and 100 mole percent of the polyfunctional hydroxyl component. Mole percentages of a branching agent are based on the total moles of repeating (ester-linked diacid-diol) units.

For purposes herein, an essentially amorphous polymer is defined as a polymer that does not exhibit a substantially crystalline melting point, Tm, i.e., no discernable heat of fusion or a heat of fusion less than 5 J/g, when determined by differential scanning calorimetry (DSC) analysis from the second heating ramp by heating of the sample at 10° C./min from 0° C. to 300° C. For purposes herein, in the absence of DSC analysis, an amorphous polymer is indicated if injection molding of the polymer produces an article which is essentially clear, wherein the injection molding process used is known to produce articles having cloudy or opaque character upon injection molding of a semi-crystalline polymer having similar properties to the amorphous polymer.

Conversely, a polymer exhibiting a crystalline melting point may be crystalline or, as is more common for polyesters, semicrystalline. A semicrystalline polymer contains least 5 weight percent of a region or fraction having a crystalline morphology and at least 5 weight percent of a region or fraction having an amorphous morphology.

For purposes herein, the melting temperature, crystallization temperature, glass transition temperature, etc., are determined by DSC analysis from the second heating ramp by heating of the sample at 10° C./min. from 0° C. to 300° C. The melting, crystallization, and glass transition temperatures are measured as the midpoint of the respective endotherm or exotherm in the second heating ramp.

Unless indicated otherwise, inherent viscosity is determined in 0.5% (g/dL) dichloroacetic acid solution at 25° C. by means of a CANNON TYPE B glass capillary viscometer, adapted from ASTM method D4603. Inherent viscosity at 0.5 g/dL dichloroacetic acid solution was used to calculate intrinsic viscosity according to the method outlined in Ma et al., "Fiber Spinning, Structure, and Properties of Poly(ethylene terephthalate-co-4,4'-bibenzoate) Copolyesters", *Macromolecules,* 2092, 35, 5123-5130. Inherent viscosity ($\eta_{inch}$) is calculated as the ratio of the natural logarithm of the relative viscosity to the mass concentration of the polymer according to the equation (A):

$$\eta_{inh} = \frac{\ln \eta_{rel}}{c} \quad (A)$$

where c is the mass concentration of the polymer (g/dL) and $\rho_{rel}$ is the relative viscosity, which is determined according to the equation (B):

$$\eta_{rel} = \frac{\eta}{\eta_0} \quad (B)$$

where ρ is the viscosity of the solution and $\rho_0$ is the viscosity of the neat solvent. Unless otherwise specified, inherent viscosity is expressed as dL/g.

It is to be understood that for purposes herein, a polymer referred to as a "bibenzoate" comprises a diacid component comprising residues derived from a biphenyl dicarboxylic acid or ester producing equivalent thereof, such as, for example, 3,4'-biphenyl dicarboxylic acid or ester producing equivalent thereof as disclosed herein, 4,4'-biphenyl dicarboxylic acid or ester producing equivalent thereof as disclosed herein, or the combination thereof.

The difunctional hydroxyl compound can be a dihydric alcohol such as, for example, glycols and diols. The term "glycol" as used in this application includes, but is not limited to, diols, glycols, and/or multifunctional hydroxyl compounds. In embodiments, the difunctional hydroxyl compound may be an alicyclic or aromatic nucleus bearing 2 hydroxyl substituents such as, for example, 1,4-cyclohexanedimethanol, hydroquinone, or the like.

For purposes herein, a polymer is "essentially free of crosslinking" if it contains no more than 5 weight percent gel by weight of the polymer. In all embodiments and aspects herein, the polyester may be essentially free of crosslinking.

The following abbreviations are used herein: ASTM is ASTM International, formerly the American Society for Testing and Materials, 3,4'BB is dimethyl 3,4'-biphenyldicarboxylate; 4,4'BB is dimethyl 4,4'-biphenyldicarboxylate; BPA is bisphenol A; CHDM is 1,4-cyclohexanedimethanol, sometimes referred to as 1,4-cyclohexylenedimethylene in the as-polymerized form; DCA is dichloroacetic acid; DEG is diethylene glycol; DMA is dynamic mechanical analysis; DMT is dimethyl terephthalate; DSC is differential scanning calorimetry; EG is ethylene glycol; GPC is gel permeation chromatograph; HDT is heat distortion temperature; NPG is neopentyl glycol, 2,2-dimethyl-1,3-propanediol; PC is bisphenol A polycarbonate; PCT is poly(1,4-cyclohexylenedimethylene terephthalate); PCTG is PCT modified with loss than 50 mol % ethylene glycol; PEN is polyethylene naphthalate; PET is polyethylene terephthalate; PETG is PET modified with less than 50 mol % of CHDM; TFA is trifluoroacetic acid; TFA-d is deuterated trifluoroacetic acid; TGA is thermogravimetric analysis; THF is tetrahydrofuran; TMA is trimellitic anhydride; TMCBD is 2,2',4,4'-tetramethyl-1,3-cyclobutanediol; DMT is dimethyl terephthalate.

Polyesters according to embodiments herein may be prepared from a diacid component and a diol component, which react in substantially equal molar proportions and are incorporated into the polyester polymer as their corresponding residues. The polyesters useful in the present invention, therefore, can contain substantially equal molar proportions of acid residues (100 mol %) and diol residues (100 mol %) such that the total moles of repeating, units are equal to 100 mole percent. The mole percentages provided in the present invention, therefore, may be based on the total moles of acid residues, the total moles of diol residues, or the total moles of repeating units unless otherwise indicated.

In embodiments, the bibenzoate residues in the copolyester may be derived from dimethyl 4,4'-biphenyldicarboxylate and/or dimethyl 3,4'-biphenyldicarboxylate comonomers, e.g., by reaction with one or more diols.

In some embodiments according to the invention, a copolyester, which may be referred to simply as the "polymer" or the "bibenzoate polymer" for brevity, comprises two or more bibenzoate isomers, e.g., equal to or greater than about 1 mole percent 4,4'-biphenyl dicarboxylic acid (derived from the diacid or ester producing equivalent thereof) and equal to or greater than about 1 mole percent 3,4'-biphenyl dicarboxylic acid (derived from the diacid or ester producing equivalent thereof) in combination with the diol component. In embodiments, the diacid component of the copolyester consists essentially of 4,4'-biphenyl dicarboxylic acid, and 3,4'-biphenyl dicarboxylic acid.

In embodiments, the diacid component of the copolyester comprises a lower limit for 4,4'-biphenyl dicarboxylic acid selected from about 1, or 10, or 20, or 30, or 40, or 50, or b60, or 65, or 70, or 75, or 80 mole percent, based on the total moles of the diacid component, up to any higher limit of about 99, or 90, or 85, or 75, or 70, or 65, or 60 mole percent preferably with the balance of the diacid component being 3,4'-biphenyl dicarboxylic acid. For example, the diacid component may comprise from about 10 to 90 mole percent 4,4'-biphenyl dicarboxylic acid, and from about 90 to 10 mole percent 3,4'-biphenyl dicarboxylic acid; or front about 30 to 80 mole percent 4,4'-biphenyl dicarboxylic acid, and from about 70 to 20 mole percent 3,4'-biphenyl dicarboxylic acid; or from about 50 to 90 mole percent 4,4'-biphenyl dicarboxylic acid, and from about 50 to 10 mole percent 3,4'-biphenyl dicarboxylic acid; or the like; all based on the total moles in the diacid component.

In some embodiments where the copolyester is essentially amorphous, depending on the diol composition the diacid may comprise from about 30 to 90 mole percent 4,4'-biphenyl dicarboxylic acid, and from about 70 to 10 mole percent 3,4'-biphenyl dicarboxylic acid; or from about 30 to 80 mole percent 4,4'-biphenyl dicarboxylic acid, and from about 50 to 20 mole percent 3,4'-biphenyl dicarboxylic acid; or from about 60 to 80 mole percent 4,4'-biphenyl dicarboxylic acid, and from about 40 to 20 mole percent 3,4'-biphenyl dicarboxylic acid; or from about 55 to 75 mole percent 4,4'-biphenyl dicarboxylic acid, and from about 45 to 25 mole percent 3,4'-biphenyl dicarboxylic acid; or the like; all based on the total moles in the diacid component.

In some embodiments where the copolyester is semicrystalline, the diacid may compose from about 50 to 90 mole percent 4,4'-biphenyl dicarboxylic acid, and from about 50 to 10 mole percent 3,4'-biphenyl dicarboxylic acid; or from about 60 to 80 mole percent 4,4'-biphenyl dicarboxylic acid, and from about 40 to 20 mole percent 3,4'-biphenyl dicarboxylic acid; or from about 65 to 75 mole percent 4,4'-biphenyl dicarboxylic acid, and from about 35 to 25 mole percent 3,4'-biphenyl dicarboxylic acid; or from about 60 to 80 mole percent 4,4'-biphenyl dicarboxylic acid, and from about 40 to 20 mole percent 3,4'-biphenyl dicarboxylic acid; or from about 65 to 75 mole percent 4,4'-biphenyl dicarboxylic acid, and from about 35 to 25 mole percent 3,4'-biphenyl dicarboxylic acid; or from about 75 to 85 mole percent 4,4'-biphenyl dicarboxylic acid, and from about 25 to 15 mole percent 3,4'-biphenyl dicarboxylic acid, or the like; all based on the total moles in the diacid component.

In some embodiments of the invention, the diacid component consists of or consists essentially of 4,4'-biphenyl dicarboxylic acid and 3,4'-biphenyl dicarboxylic acid, and/ or the total moles of 4,4'-biphenyl dicarboxylic acid and 3,4'-biphenyl dicarboxylic acid in any of the ranges provided herein total 100 mole percent.

In some embodiments, the diacid component in the copolyester may comprise additional polyfunctional acids in amounts as desired, such as, for example, from about 0.1 to 90 mole percent, preferably 0.1 to 5 mole percent or less that 1 mole percent, of one or more of terephthalic acid, isophthalic acid, phthalic acid, naphthalic acid, 1,5-naphthalenedicarboxylic acid, 2,6-naphthalenedicarboxylic acid, or 2,7-naphthalenedicarboxylic acid, or the like, derived from the corresponding acids, esters or any ester producing equivalents thereof.

In some embodiments of the invention, the diol component comprises aliphatic polyols, especially alkylene diols, having 2 to 20 carbon atoms (preferably from 2 to 10 or from 2 to 5 carbon atoms), alicyclic polyols having 3 to 20 carbon atoms, aromatic polyols having 6 to 20 carbon atoms, and so on, where any diol component constituent may be present in the copolyester, for example, in an amount equal to or greater than about 1 mole percent, based on the total moles of the diol component in the copolyester. In embodiments, the diol component comprises ethylene glycol, neopentyl glycol, 1,2-propanediol, 1,3-propanediol, 1,4-butanediol, 1,5-pentanediol, 1,6-hexanediol, isosorbide, isoidide, isomannide, 1,3-cyclohexanedimethanol, 1,4-cyclohexanedimethanol, p-xylene glycol, or a combination thereof. In embodiments, the diol component of the polyester copolymer comprises 1,4-cyclohexanedimethanol and an alkylene diol having 2 to 20 carbon atoms, preferably from 2 to 10 or from 2 to 5 carbon atoms, preferably ethylene glycol, 1,3-propanediol, 1,4-butanediol, 1,6-hexanediol, neopentylglycol, or a combination thereof.

In some embodiments of the invention, the diol component comprises an alicyclic polyol, such as, for example, a polyol having 4 to 20 carbon atoms and containing one or more 4- to 7-member aliphatic rings, e.g., a cyclohexanedimethanol such as 1,3-cyclohexanedimethanol and/or 1,4-cyclohexanedimethanol (CHDM); 2,2,4,4-tetramethyl-1,3-cyclobutanediol; and so on. In some embodiments, the alicyclic diol, e.g., CHDM, is present in the copolyester an amount effective to control crystallinity, mechanical properties, the glass transition temperature Tg, and/or the melting temperature Tm, e.g., equal to or greater than about 5 mole percent, or equal to or greater than about 10 mole percent of the diol component, up to about 90 mole percent, based on the total moles of the diol component in the copolyester.

In some embodiments of the invention, the diol component of the copolyester comprises, or consists essentially of, CHDM and alkylene diol, especially ethylene glycol (EG), and/or the total moles of CHDM and alkylene diol total 100 mole percent. In general, higher levels of CHDM relative to alkylene diol, especially EG, can increase Tg, reduce Tm, shift the morphology toward amorphous (reduce crystallinity), and/or increase toughness (elongation to break), whereas higher levels of EG or other alkylene diol generally have the opposite effect for polyester property control. In embodiments, the diol component of the copolyester comprises a lower limit for CHDM selected from about 1, or 10, or 15, or 20, or 25, or 30, or 35, or 40, or 50 mole percent, based on the total moles of the diol component; up to any higher limit of about 99, or 90, or 85, or 80, or 75, or 70, or 65, or 60, or 50 mole percent, preferably with the balance of the diol component being alkylene diol, preferably EG, 1,3-propanediol, 1,4-butanediol, 1,6-hexanediol, NPG or a combination thereof, especially EG and/or NPG.

For example, the diol may comprise from about 10 to 90 mole percent CHDM, and from about 90 to 10 mole percent EG, for other alkylene diol); or from about 20 to 80 mole percent CHDM, and from about 80 to 20 mole percent EG for other alkylene diol); or from about 30 to 70 mole percent CHDM, and from about 70 to 30 mole percent EG (or other alkylene diol); or from about 35 to 65 mole percent CHDM, and from about 65 to 35 mole percent EG (or other alkylene diol); or from about 20 to 50 mole percent CHDM, and from about 30 to 50 mole percent EG (or other alkylene diol); or from about 30 to 40 mole percent CHDM, and from about 70 to 60 mole percent EG (or other alkylene diol); or from about 20 so 50 mole percent EG (or other alkylene diol); and from about 80 to 50 mole percent CHDM; or from about 30 to 40 mole percent EG (or other alkylene diol); and from about 70 to 60 mole percent CHDM, or the like, all based on the total moles in the diol component.

In some embodiments of the invention, the diol component of the copolyester comprises or consists essentially of alkylene diol selected from ethylene glycol (EG) and neopentyl glycol (NPG), and CHDM, where the CHDM is present in the copolyester in the amounts set out above, and wherein the alkylene diol(s) (e.g., NPG alone or NPG and EG together) are present in the amounts set out above for the EG, e.g., the diol component of the copolyester comprises a lower limit for NPG (or a combination of NPG and EG) selected from about 1, or 10, or 15, or 20, or 25, or 30, or 35, or 40, or 50 mole percent, based on the total moles of the diol component; up to any higher limit of about 99, or 90, or 85, or 80, or 75, or 70, or 65, or 60, or 50 mole percent, preferably with the balance of the diol component being CHDM. Where EG and NPG are both present they may be in a molar ratio of EG-NPG of from 1:20 to 20:1.

In some embodiments of the invention, the polymer may further comprise a branching agent as defined above, e.g., a multifunctional hydroxyl or carboxylic acid compound, preferably a polyfunctional acid compound such as trimellitic or pyromellitic anhydride. In some embodiments of the invention, the branching agent is present in an amount effective to reduce the crystallinity and/or the rate of crystallization, and/or up to an amount that does not result in significant crosslinking, e.g., the copolyester can be essentially free of crosslinking or gel formation. In embodiments, the copolymer comprises an amount of trimellitic anhydride suitable to form a measurable amount of long chain branching in the copolymer, as determinable by DSC analysis at a heating rate of 10° C./min, $^1$H NMR analysis, or $^{13}$C NMR analysis. In the event of a conflict, DSC analysis shall control, then $^1$H NMR.

In some embodiments of the invention, the copolyester comprises equal to or greater than about 0.001 mole percent of the branching agent (e.g., a tricarboxylic acid moiety or ester producing derivative thereof), based on the total moles of repeating units in the copolyester. For example, the branching agent (e.g., trimellitic anhydride) may be present at from about 0.0001 to 1 mole percent, or from about 0.005 to 0.5 mole percent, or from about 0.01 to 0.5 mole percent, of from about 0.02 to 0.3 mole percent, or from about 0.05 to 0.3 mole percent, or from about 0.1 to 0.3 mole percent, based on the total moles of repeating units in the copolyester. In some embodiments, the diacid component of the polymer consists essentially of 4,4'-biphenyl dicarboxylic acid, 3,4'-biphenyl dicarboxylic acid, and trimellitic anhydride.

In some embodiments of the invention, the polymer comprises a number average molecular weight Mn equal to or greater than 5,000 or equal to or greater than 8,000, or equal to or greater than 10,000, or equal to or greater than 15,000, or equal to or greater than 20,000, or equal to or greater than 30,000, or equal to or greater than 40,000, or equal to or greater than 50,000; and/or a polydispersity of greater than 1.75 up to 3.5, or from 1.8 up to 3, or from 1.8 to 2.5, or from 1.9 to 2.5, or about 2.0, where Mn and polydispersity are determined by GPC or calculated from the inherent viscosity.

In some embodiments of the invention, the polymer comprises an inherent viscosity equal to or greater than about 0.5 dL/g, or equal to or greater than 0.7 dL/g, or equal to or greater than 0.8 dL/g, and/or less than or equal to about 1 dL/g, or less than or equal to about 0.9 dL/g, measured at a temperature of 25° C. in dichloroacetic acid.

In embodiments, the polymer comprises a glass transition temperature equal to or greater than about 95° C., or equal to or greater than about 100° C., or equal to or greater than about 105° C., or equal to or greater than about 110° C., or equal to or greater than about 115° C., or equal to or greater than about 120° C., or equal to or greater than about 125° C., or equal to or greater than 130° C., or up to about 135° C. or greater, determined by DSC analysis from a second heating, ramp at a heating rate of 10° C./min.

In some embodiments of the invention the copolyester comprises a semicrystalline morphology. In embodiments, the polymer comprises an amount of 4,4'-biphenyl dicarboxylic acid (relative to 3,4'-BB) and/or ethylene glycol (or other alkylene diol) (relative to CHDM) sufficient to produce a melting point peak, a crystallization point peak, or both determined by DSC analysis.

In some additional or alternative embodiments, the polyester copolymer comprises up to about 55 weight percent crystallinity, or up to about 35 weight percent crystallinity, or less than or equal to 30 weight percent crystallinity, or less than or equal to about 20 weight percent crystallinity, or less than or equal to about 10 weight percent crystallinity, or less than or equal to about 5 weight percent crystallinity, or less than or equal to about 1 weight percent crystallinity, determined by DSC analysis.

In embodiments, the polymer composes a melting temperature Tm of less than or equal to about 280° C., or less than or equal to about 275° C., or less than or equal to about 270° C., or less than or equal to about 260° C., or less than or equal to about 250° C., or less than or equal to about 240° C., or less than or equal to about 230° C., or less than or equal to about 220° C., or less than or equal to about 210° C., or less than or equal to about 200° C., or less than or equal to about 190° C., or less than or equal to about 180° C., determined by DSC analysis from a second heating ramp at a heating rate of 10° C./min.

In embodiments, the polymer comprises a thermal degradation temperature of equal to or greater than about 300° C. determined at 5 weight percent according to ASTM D3850. In embodiments, the polymer comprises from about 5 to 20 weight percent crystallinity. In alterative embodiments, the polymer is amorphous. In embodiments, the polymer does not comprise a measurable crystallization temperature Tc and/or does not comprise a discernable melting temperature Tm, as determined by DSC.

In some embodiments of the invention, the polymer comprises an elongation at break of equal to or greater than about 20, or 35, or 50, or 65, or 75, or 85, or 90, or 95, or 100, or 110, or 125, or 150 percent determined according to ASTM D638.

In some embodiments of the invention, the polymer comprises a tensile strength of equal to or greater than about 60 MPa or equal to or greater than about 80 MPa, or equal to or greater than about 100 MPa, determined according to ASTM D638.

In some embodiments of the invention, the polymer comprises a tensile modulus of equal to or greater than about 1700 MPa, determined according to ASTM D638.

In some embodiments of the invention, the polymer comprises a flexural strength of equal to or greater than about 80 MPa, determined according to ASTM D638.

In some embodiments of the invention, the polymer comprises a flexural modulus of equal to or greater than about 2500 MPa determined according to ASTM D658.

Some inventive embodiments of the polyester copolymer include an unproved heat distortion temperature (HDT), which is the temperature at which a sample deforms under a specified load of 455 kPa or 1.82 MPa, determined according to ASTM D648. In embodiments, the copolyester comprises an HOT at 455 kPa of equal to or greater than about 65° C., or equal to or greater than about 70° C., or equal to or greater than about 75° C. or equal to or greater than about 80° C., or equal to or greater than about 90° C., or equal to or greater than about 100° C., or equal to or greater than about 105° C., determined according to ASTM D648. In embodiments, the polyester copolymer comprises an HDT at 1.82 MPa of equal to or greater than about 65° C., or equal to or greater than about 70° C., or equal to or greater than about 75° C., or equal to or greater than about 80° C., or equal to or greater than about 90° C., determined according to ASTM D648.

Some inventive embodiments of the polyester copolymer comprise a thermal degradation temperature (Td) of equal to or greater than about 300° C., or equal to or greater than about 350° C., or equal to or greater than about 375° C., or equal to or greater than about 400° C., at 5 weight percent as determined according to ASTM D3850.

According to an aspect of the invention, a copolyester comprises:

a. a diol component comprising ethylene glycol (or other alkylene diol) and an alicyclic polyhydroxyl compound; and b. a diacid component comprising 4,4'-biphenyl dicarboxylic acid and 3,4'-biphenyl dicarboxylic acid.

In some embodiments, the diol component comprises from about 10 to 90 mole percent CHDM, based on the total moles of the diol component in the polyester, and the diacid component comprises from about 30 to 90 mole percent of the 4,4'-biphenyl dicarboxylic acid and from about 70 to 10 mole percent of the 3,4'-biphenyl dicarboxylic acid, based on the total moles of the diacid component in the copolyester.

In some embodiments, the copolyester further comprises a branching agent. In some embodiments, the copolyester comprises from about 0.01 to 0.5 mole percent trimellitic acid, trimellitic anhydride, pyromellitic acid, pyromellitic anhydride, or a combination thereof, based on the total moles of repeating units in the copolyester.

In some embodiments, the copolyester comprises an average number molecular weight of equal to or greater than about 5,000 g/mol and a polydispersity from about 1.75 to 3.5. In some embodiments, the copolyester comprises a glass transition temperature equal to or greater than about 100° C., determined by differential scanning calorimetry (DSC) analysis from a second heating ramp at a heating rate of 10° C./min. In some embodiments, the copolyester comprises a melting temperature of less than or equal to about 280° C., or less titan or equal to about 275° C., or less than or equal to about 270° C., or less than or equal to about 260°

C. or less than or equal to about 250° C. or less than or equal to about 240° C. or less than or equal to about 230° C., or less than or equal to about 220° C., or less than or equal to about 210° C., or less than or equal to about 200° C., or less than or equal to about 190° C., or less than or equal to about 180° C., determined by DSC analysis from a second heating ramp at a heating rate of 10° C./min.

In some embodiments, the copolyester comprises:
a. an essentially amorphous morphology;
b. a glass transition temperature equal to or greater than about 110° C. determined by DSC analysis from a second heating ramp at a heating rate of 10° C./min;
c. wherein the diacid component comprises from about 30 to 80 mole percent of the 4,4'-biphenyl dicarboxylic acid and from about 70 to 20 mole percent of the 3,4'-biphenyl dicarboxylic acid, based on the total moles of the diacid component in the copolyester;
d. wherein the diol component comprises from about 10 to 90 mole percent 1,4-cyclohexanedimethanol, based on the total moles of the diol component in the copolyester; and
e. optionally from about 0.01 to 0.5 mole percent of a branching agent, based on the total moles of repeating units in the copolyester.

In some embodiments, the copolyester comprises:
a. a semicrystalline morphology;
b. a melting temperature of less than or equal to about 280° C., preferably less than or equal to about 270° C., or less than or equal to about 250° C., or less than or equal to about 240° C., or less than or equal to about 200° C., or less than or equal to about 180° C., determined by DSC analysis from a second heating ramp at a heating rate of 10° C./min;
c. a glass transition temperature equal to or greater than about 110° C. determined by DSC analysis;
d. wherein the diol component comprises ethylene glycol and from about 10 to 90 mole percent of 1,4-cyclohexanedimethanol, based on the total moles of the diol component in the copolyester; and
e. wherein the diacid component comprises from about 50 to 80 mole percent of the 4,4'-biphenyl dicarboxylic acid and from about 20 to 50 mole percent of the 3,4'-biphenyl dicarboxylic acid, based on the total moles of the diacid component in the copolyester.

In some embodiments, the copolyester comprises:
1) an elongation at break of equal to or greater than about 85 percent, determined according to ASTM D638; and/or
2) a tensile strength of equal to or greater than about 60 MPa determined according to ASTM D638; and/or
3) a tensile modulus of equal to or greater than about 1700 MPa, determined according to ASTM D638; and/or
4) a flexural strength of equal to or greater than about 80 MPa, determined according to ASTM D790; and/or
5) a flexural modulus of equal to or greater than about 2500 MPa, determined according to ASTM D790; and/or
6) a heat distortion temperature at 455 kPa of equal to or greater than about 90° C., determined according to ASTM D648; and/or
7) a heat distortion temperature at 1.82 MPa of equal to or greater than about 70° C., determined according to ASTM D648;
8) or a combination thereof.

In another aspect, a copolyester comprises:
a. an essentially amorphous morphology;
b. a diol component comprising ethylene glycol and from about 20 to 80 mole percent 1,4-cyclohexanedimethanol, based on the total moles of the component in the copolyester;
c. a diacid component comprising from about 30 to 80 mole percent of 4,4'-biphenyl dicarboxylic acid, and from about 70 to 20 mole percent of 3,4'-biphenyl dicarboxylic acid, based on the total moles of the diacid component in the copolyester;
d. optionally from about 0.1 to 0.5 mole percent trimellitic or pyromellitic anhydride, based on the total moles of repeating units in the copolyester;
e. a glass transition temperature equal to or greater than about 110° C. determined by differential scanning calorimetry (DSC) analysis from a second heating ramp at a heating rate of 10° C./min; and
f. one or more of the properties selected from:
  1) an elongation at break greater than about 85 percent determined according to ASTM D638; and/or
  2) a tensile strength of equal to or greater than about 60 MPs determined according to ASTM D638; and/or
  3) a tensile modulus of equal to or greater than about 1700 MPa determined according to ASTM D638; and/or
  4) a flexural strength of equal to or greater than about 80 MPa determined according to ASTM D790; and/or
  5) a flexural modal us of equal to or greater than about 2500 MPa determined according to ASTM D790; and/or
  6) a heat distortion temperature at 455 kPa of equal to or greater than about 90° C. determined according to ASTM D648; and/or
  7) a heat distortion temperature at 1.82 MPa of equal to or greater than about 70° C. determined according to ASTM D648.

In some embodiments of the invention, 4,4'-biphenyl dicarboxylic acid comprises at least about 50 mole percent of the diacid component, 1,4-cyclohexanedimethanol comprises from about 30 to 90 mole percent of the diol component and the glass transition temperature is equal to or greater than about 120° C.

In another aspect of the invention, a copolyester comprises:
a. a semicrystalline morphology;
b. a diol component comprising ethylene glycol (or other alkylene diol) and from about 20 to 80 mole percent 1,4-cyclohexanedimethanol, based on the total moles of the diol component in the copolyester;
c. a diacid component comprising from about 60 to 90 mole percent of 4,4'-biphenyl dicarboxylic acid, and from about 40 to 10 mole percent of 3,4'-biphenyl dicarboxylic acid, based on the total moles of the diacid component in the copolyester;
d. a melting temperature less than or equal to about 240° C., preferably less than or equal to about 220° C., or less than or equal to about 210° C., or less than or equal to about 200° C., or less than or equal to about 190° C., or less than or equal to about 180° C., determined by DSC analysis from a second heating ramp at a heating rate of 10° C./min determined by differential scanning calorimetry (DSC) analysis from a second heating ramp at a heating rate of 10° C./min;
e. a glass transition temperature equal to or greater than about 120° C. determined, by DSC analysis from a second heating ramp at a heating rate of 10° C./min; and f. one or more of the properties selected from:
  1) an elongation at break greater than about 85 percent determined according to ASTM D638; and/or
  2) a tensile strength of equal to or greater than about 60 MPa determined according to ASTM D638; and/or
  3) a tensile modulus of equal to or greater than about 1700 MPa determined according to ASTM 0638; and/or
  4) a flexural strength of equal to or greater than about 80 MPa determined according to ASTM D790; and/or
  5) a flexural modulus of equal to or greater than about 2500 MPa determined according to ASTM D790; and/or
  6) a heat distortion temperature at 455 kPa of equal to or greater than about 90° C., determined according to ASTM D648; and and/or
  7) a heat distortion temperature at 1.82 MPa of equal to or greater than about 70° C. determined according to ASTM D648.

In some embodiments of the copolyester the melting temperature is or less than or equal to about 210° C., or less than or equal to about 200° C., or less than or equal to about 190° C., or less than or equal to about 180° C.

In some embodiments of the invention, the copolyesters may be prepared by melt polymerization techniques including transesterification and polycondensation, in batch, semi-batch or continuous processes. The copolyesters are preferably prepared in a reactor equipped with a stirrer, an inert gas (e.g., nitrogen) inlet, a thermocouple, a distillation column connected to a water-cooled condenser, a water separator and a vacuum connection tube. Any of the equipment and procedures disclosed in U.S. Pat. Nos. 4,093,603 and 5,681,918, incorporated by reference herein, may be adapted for implementing some embodiments of the present invention.

In some embodiments, polycondensation processes may include melt phase processes conducted with the introduction of an inert gas stream, such as nitrogen, to shift the equilibrium and advance to high molecular weight and/or vacuum melt phase polycondensation at temperatures above about 150° C. and pressures below about 130 Pa (1 mm Hg). The esterification conditions can include, in some embodiments of the invention, an esterification catalyst, such as, for example, sulfuric acid, a sulfonic acid, and so on, preferably in an amount from about 0.05 to 1.50 percent by weight of the reactants; optional stabilizers, such as, for example, phenolic antioxidants such as IRGANOX 1010 or phosphonite- and phosphite-type stabilizers such as tributylphosphite, preferably in an amount from 0 to 1 percent by weight of the reactants; a temperature which is gradually increased, from about 130° C. In the initial reaction steps up to about 190 to 280° C. in the later steps, initially under normal, pressure, then, when necessary, under reduced pressure at the end of each step, while maintaining these operating conditions until a copolyester with the desired properties is obtained. If desired, the degree of esterification cation may be monitored by measuring the amount of water formed and the properties of the copolyester, for example, viscosity, hydroxyl number, acid number, and so on.

In embodiments, the polymerization reaction to produce the copolyesters may be carried out in the presence of one or more esterification catalysts as mentioned above. Suitable catalysts may also include those disclosed in U.S. Pat. Nos. 4,025,492, 4,136,089, 4,176,224, 4,238,593, and 4,208,527, which are hereby incorporated herein by reference. Suitable catalyst systems may include compounds of Ti, Ti/P, Mn/Ti/Co/P, Mn/Ti/P, Zn/Ti/Co/P, Zn/Al, Sb (e.g., $Sb_2O_3$), Sn (e.g., dibutyltin oxide, dibutyltin dilaurate, n-butyltin trioctoate) and so on. When cobalt is not used in the polycondensation, copolymerizable toners may be incorporated into the copolyesters to control the color of these copolyesters so that they are suitable for the intended applications where color may be an important property. In addition to the catalysts and toners, other additives, such as antioxidants, dyes, etc. may be used during the copolyesterification, or may be added after formation of the polymer.

In embodiments, the copolyesters may include conventional additives including pigments, colorants, stabilizers, antioxidants, extrusion, aids, reheat agents, slip agents, carbon black, flame retardants and mixtures thereof. In embodiments, the copolyester may be combined or blended with one or more modifiers and/or blend polymers including polyamides; e.g., NYLON 6,6® (DuPont), poly(ether-imides), polyphenylene oxides, e.g., poly(2,6-dimethylphenylene oxide), poly(phenylene oxide)/polystyrene blends; e.g., NORYL® (GE), other polyesters, polyphenylene sulfides, polyphenylene sulfide/sulfones, poly(ester-carbonates), polycarbonates; e.g., Lexan® (GE), polysulfones, polysulfone ethers, poly(ether-ketones), combinations thereof, and the like.

Any of the copolyesters and compositions described herein may be used in the preparation of molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art. The PAO compositions described above may also be used in the preparation of nonwoven fabrics and fibers. In embodiments, a shaped article such as an extruded profile or an extruded or injection molded article comprises one or more copolyesters according to one or more embodiments disclosed herein. Accordingly, in embodiments, copolyesters according to the instant invention can be molded and extruded using conventional melt processing techniques to produce a shaped article. Such articles may be transparent. The shaped articles manufactured from the copolyesters according to embodiments disclosed herein exhibit improved properties as shown in the examples below.

Shaped articles comprising one or more embodiments of the polymers disclosed herein may be produced using thermoplastic processing procedures such as injection molding, calendaring, extrusion, blow molding, extrusion blow molding, rotational molding, and so on. The amorphous and/or semicrystalline copolyesters according to some embodiments of the present invention exhibit improved stability at various melt temperatures. In the conversion of the copolyesters into shaped articles, the moisture content of copolyesters according to some embodiments of the present invention may be reduced to less than about 0.02 percent prior to melt processing.

In some embodiments according to the present invention, the glass transition temperature, and/or the degree of crystallinity of the copolyester, and/or mechanical properties, can be controlled by selecting the amounts of the 4,4BB, 3,4'BB, alicyclic polyhydroxyl compound and/or branching agent employed. In some embodiments, increasing the relative amount(s) of the 4,4BB, alicyclic polyhydroxyl compound and/or branching agent, especially the 4,4BB and/of alicyclic polyhydroxyl compound, increases the glass transition temperature; and at the same time, increasing the relative amount of the 4,4BB increases the degree of crystallinity, whereas increasing the relative amount of the alicyclic polyhydroxyl compound and/or the branching agent tend to decrease the degree of crystallinity. In this manner, the glass transition temperature and degree of crystallinity can be balanced as desired. The cis:trans ratio of the CHDM, when CHDM is present, can also influence the degree of crystallinity, e.g., more cis-CHDM may tend to reduce the effect of CHDM on crystallinity whereas more trans-CHDM may increase the effect.

For example, in a semicrystalline copolyester according to some embodiments of the invention, the degree of crystallinity can be reduced by increasing the alicyclic polyhydroxyl compound and/or the branching agent amounts, and in some embodiments, the presence of enough of the alicyclic polyhydroxyl compound and/or the branching agent can reduce the crystallinity even to a level where the copolyester is otherwise essentially amorphous. Meanwhile, the level of the 4,4BB can work at cross-purposes to increase the degree of crystallinity, and also has the effect in some embodiments of increasing the Tg.

For example, it is considered in some embodiments according to this invention that the level(s) of the alicyclic polyhydroxyl compound and/or the branching agent can facilitate an essentially amorphous morphology with a relatively higher Tg at high levels of the 4,4'BB that would otherwise obtain substantial crystallinity, e.g., a semicrystalline morphology.

Conversely, in semicrystalline copolyesters containing a relatively 4,4'BB level, the degree of crystallinity can be decreased by increasing the level of alicyclic polyhydroxyl compound in the diol component and/or by increasing the level of the branching agent, thereby improving, facilitating the retention of, and/or only marginally reducing one or more desirable tensile and thermal properties of the high 4,4'BB copolyester. Meanwhile, in some embodiments the Tg and/or melting temperature Tm of the semicrystalline copolyester can be substantially elevated.

In an aspect of the invention, a method comprises contacting (i) a diol component comprising ethylene glycol (or other alkylene diol) and 1,4-cyclohexanedimethanol, with (ii) a diacid component comprising 4,4'-biphenyl dicarboxylic acid or ester producing equivalent thereof and 3,4'-biphenyl dicarboxylic acid or ester producing equivalent thereof, in the presence of (iii) a catalyst, and forming a copolyester comprising the ethylene glycol (or other alkylene diol), 1,4-cyclohexanedimethanol, 4,4'-biphenyl dicarboxylic acid and 3,4'-biphenyl dicarboxylic acid.

In some embodiments of the method, the contacting further comprises a branching agent wherein the copolyester comprises branching and or an amorphous morphology.

In some embodiments of the method, a proportion of the 1,4-cyclohexanedimethanol in the diol component, and a proportion of the 4,4'-biphenyl dicarboxylic acid or ester producing equivalent thereof in the diacid component, are selected wherein the copolyester comprises:
  a. an essentially amorphous morphology; and
  b. a glass transition temperature equal to or greater than about 100° C., determined by differential scanning calorimetry (DSC) analysis from a second heating ramp at a heating rate of 10° C./min.

In some embodiments of the method, a proportion of the 1,4-cyclohexanedimethanol in the diol component, and a proportion of the 4,4'-biphenyl dicarboxylic acid or ester producing equivalent thereof in the diacid component, are selected wherein the copolyester comprises:
  a. a semicrystalline morphology;
  b. a melting temperature less than or equal to about 280° C., preferably less than or equal to about 250° C., determined by DSC analysis from a second heating ramp at a heating rate of 10° C./min; and
  c. a glass transition temperature equal to or greater than about 100° C., determined by DSC analysis from a second heating ramp at a heating rate of 10° C./min.

In some embodiments of the method, the contacting comprises melt transesterification and polycondensation for step polymerization of the diacid and diol components.

In some embodiments, the method further comprises:
  a. selecting relative proportions of the diol, component wherein the copolyester comprises ethylene glycol (or other alkylene diol) and from about 10 to 90 mole percent 1,4-cyclohexanedimethanol based on the total moles of the diol component in the copolyester;
  b. selecting relative proportions of the diacid component wherein the copolyester comprises from about 30 to 80 mole percent 4,4'-biphenyl dicarboxylic acid and from about 70 to 20 mole percent 3,4'-biphenyl dicarboxylic acid, based on the total moles of the diacid components;
  c. wherein the selections of the relative proportions of the diol and diacid components are made to control, morphology, glass transition temperature, melting temperature and/or toughness.

In some embodiments of the method:
  a. the relative proportions of the diol component comprise from about 20 to 80 mole percent 1,4-cyclohexanedimethanol, based on the total moles of the diol component in the copolyester;
  b. the relative proportions of the diacid component comprises from about 50 to 80 mole percent 4,4'-biphenyl dicarboxylic acid, and from about 50 to 20 mole percent 3,4'-biphenyl dicarboxylic acid, based on the total moles of the diacid component; and
  c. the copolyester comprises: an essentially amorphous morphology and a glass transition temperature equal to or greater than about 120° C., as determined by differential scanning calorimetry (DSC) analysis from a second heating ramp at a heating rate of 10° C./min.

In some embodiments of the method:
  a. the relative proportions of the diol component comprise from about 20 to 80 mole percent 1,4-cyclohexanedimethanol, based on the total moles of the diol component in the copolyester;
  b. the relative proportions of the diacid component comprises from about 50 to 90 mole percent 4,4'-biphenyl dicarboxylic acid, and from about 50 to 10 mole percent 3,4'-biphenyl dicarboxylic acid, based on the total moles of the diacid component; and
  c. the copolyester comprises: a semicrystalline morphology, a melting temperature of less than or equal to about 230° C., and a glass transition temperature equal to or greater than about 120° C., as determined by differential scanning calorimetry (DSC) analysis from a second healing ramp at a heating rate of 10° C./min.

In another aspect, a method to control the morphology, glass transition temperature, melting temperature and/or toughness of a copolyester, comprises:
  a. contacting (i) a diacid component comprising from about 50 to 90 mole percent 4,4'-biphenyl dicarboxylic acid or ester producing equivalent thereof, from about 50 to 10 mole percent 3,4'-biphenyl dicarboxylic acid or ester producing equivalent thereof, based on the total moles of the diacid component in the copolyester, with (ii) a diol component comprising from 10 to 90 mole percent 1,4-cyclohexanedimethanol, based on the total moles of the diol component in the copolyester, and (iii) optionally a multifunctional carboxylic acid or ester producing equivalent thereof in the presence of (iv) a catalyst; and b. selecting a proportion of the 1,4-cyclohexanedimethanol in the diol component a proportion of the 4,4'-biphenyl dicarboxylic acid or ester producing equivalent thereof in the diacid component and a proportion of the multifunctional carboxylic acid or ester producing equivalent thereof in total repeating units, to produce a copolyester comprising:

c. an essentially amorphous or a semicrystalline morphology; and d. a glass transition temperature, within a selected range equal to or greater than about 110° C., determined by differential scanning calorimetry (DSC) analysis from a second heating ramp at a heating rate of 10° C./min; and e. where the morphology is semicrystalline, a melting temperature less than about 250° C., determined by DSC analysis from a second heating ramp at a heating rate of 10° C./min.

In some embodiments of the method:
a. the diol component comprises from about 20 to 80 mole percent 1,4-cyclohexanedimethanol;
b. the diacid component comprises from about 50 to 80 mole percent 4,4'-biphenyl dicarboxylic acid;
c. the morphology is essentially amorphous; and
d. the glass transition temperature is equal to or greater than about 115° C., determined by DSC analysis from a second heating ramp at a heating rate of 10° C./min.

In some embodiments of the method:
a. the diol component comprises from about 30 to 70 mole percent 1,4-cyclohexanedimethanol;
b. the diacid component comprises from about 60 to 80 mole percent 4,4'-biphenyl dicarboxylic acid; and
c. the glass transition temperature is equal to or greater than about 120° C., determined by DSC analysis from a second heating ramp at a heating rate of 10° C./min.

In some embodiments of the method, the glass transition temperature is equal to or greater than about 130° C.

In some embodiments of the method, the branching agent comprises from about 0.001 to 1 mole percent of branching agent, preferably selected from trimellitic acid, trimellitic anhydride, pyromellitic acid, pyromellitic anhydride, and a combination thereof, based on the total moles of repeating units in the copolyester.

In some embodiments of the method:
a. the diol component comprises from about 20 to 80 mole percent 1,4-cyclohexanedimethanol;
b. the diacid component comprises from about 60 to 90 mole percent 4,4'-biphenyl dicarboxylic acid;
c. the morphology is semicrystalline;
d. the glass transition temperature is equal to or greater than about 120° C., determined by DSC analysis from a second heating ramp at a heating rate of 10° C./min; and
e. the melting temperature Is less than about 250° C., determined by DSC analysis from a second heating ramp at a heating rate of 10° C./min.

In some embodiments of the method:
a. the diol component comprises from about 30 to 70 mole percent 1,4-cyclohexanedimethanol;
b. the diacid component comprises from about 65 to 85 mole percent 4,4'-biphenyl dicarboxylic acid; and c. the melting temperature is less than about 200° C., determined by DSC analysis from a second heating ramp at a heating rate of 10° C./min.

In some embodiments of the method:
a. the diol component comprises from about 30 to 70 mole percent 1,4-cyclohexanedimethanol;
b. the diacid component comprises from about 70 to 90 mole percent 4,4'-biphenyl dicarboxylic acid;
c. the glass transition temperature is equal to or greater than about 125° C., determined by DSC analysis from a second heating ramp at a heating rate of 10° C./min; and
d. the melting temperature is less than about 240° C., determined by DSC analysis from a second heating ramp at a heating rate of 10° C./min.

EXAMPLES

In the following examples, dimethyl 4,4'-biphenyldicarboxylate (4,4'BB) was supplied by EXXONMOBIL Chemical Company and used as received. Dimethyl 3,4'-biphenyldicarboxylate (3,4'BB) was supplied by EXXONMOBIL Chemical Company and used as received. Ethylene glycol (EG) was purchased from SIGMA-ALDRICH (≥99%) and used as received. 1,4-Cyclohexanedimethanol (CHDM) was purchased from SIGMA-ALDRICH (mixture of cis and trans, 33:67 cis:trans by $^1$H-NMR spectroscopy, ≥99%) and used as received. Trimellitic anhydride (TMA) (V) was purchased from TCI AMERICA (>98.0%) and used as received. 2,2-Dimethyl-1,3-propanediol (neopentylglycol or NPG, 99%) was obtained from a commercial source and used as received. Titanium tetraisopropoxide (99%) was purchased from SIGMA-ALDRICH, and solutions in anhydrous 1-butanol were prepared. All solvents, nitrogen gas (Praxair, 99.999%), oxygen gas (Airgas, 100%) and other gases were obtained from commercial sources and used as received. Dichloroacetic acid (≥99%) was purchased from Acros Organics. Ail other solvents were obtained from Spectrum.

In the following examples, a shorthand notation is used to indicate the relative mole percentages of the comonomers present. In all cases, the relative proportions of the bibenzoate and other polyfunctional ester monomers, i.e., the diacid acid component, add up to 100 mole percent, and the relative proportion of the diol monomers similarly add up to 100 mole percent. In the shorthand notation used herein, the percentages of the diester monomers are indicated, and the percentages of the diol monomers are indicated for example, a copolyester produced by polymerization of a mixture composing 50 mole percent 4,4'BB and 50 mole percent 3,4'BB with a mixture of 50 mole percent EG and 50 mole percent CHDM is referred to herein as "50-4,4'BB-50-3,4'BB-50-EG-50-CHDM".

Copolymers produced in the presence of TMA are referred to herein as being "branched" which is indicated by including the mole percent TMA added to the reactor. For example, a 55 mole percent 4,4'BB 45 mole percent 3,4'BB 100 percent EG polymer produced in the presence of 0.1 mole percent TMA, based on the total moles of the repeating units in the copolyester would be indicated as 55-4,4'BB-45-3,4'BB-EG-0.1-TMA.

In the following examples, the scale of the copolymer synthesis may be indicated, where relevant, by a suffix following the copolymer notation. For example, a copolymer produced on a 20 g scale may be followed by "(20 g)" and a copolymer produced on a 150 g scale by "(150 g)". $^1$H NMR spectroscopy was performed at room temperature on a VARIAN UNITY 400 at 400 MHz in deuterated trifluoroacetic acid (TFA-d). Size exclusion chromatography (SEC) was performed using a WATERS® size exclusion chromatograph in which three 5 μm PLgel® Mixed-C columns were used in combination with a WATERS 2410 refractive index (RI) detector operating at 880 nm, and a Wyatt Technologies mini DAWN® multi-angle laser light scattering (MALLS) detector operating at 690 nm with a flow rate of 1 mL min$^{-1}$ at 35° C. in tetrahydrofuran (THF). The RI detector provided molecular weights relative to polystyrene calibration. The MALLS detector enabled the determinations of absolute molecular weight after determining the dn/dc coefficient offline using a Wyatt Optilab T-rEX® differential refractometer. Prior to SEC analysis, all polymers were analyzed by DLS at 35° C. in THF to confirm no aggregation in SEC solvent.

Differential scanning calorimetry (DSC) was performed under a nitrogen flow of 50 mL/min; at a heating rate of 10° C./min; and at a cooling rate of 10° C./min on a TA instruments Q1000® DSC calibrated using indium (mp=150.60° C.) and zinc (mp=419.47° C.) standards. Glass transition temperatures were measured as the midpoint of the transition in the second heating ramp.

Compression-molded specimens were prepared for testing by melt-pressing between two stainless steel plates, layered with KAPTON® films using a PHI Q-230H manual hydraulic compression press. A Rexco PARTALL® Power Glossy Liquid mold release agent was applied to the KAPTON® films to ensure polyester did not adhere. Samples were heated (~3 minutes for amorphous; ~5 minutes for semi-crystalline) at 275° C. before the top stainless steel plate was added. The plates were then centered in the press and closed until no visible light between plates. After two more minutes of heating at 275° C., four press-release-press cycles were completed with the first two presses utilizing 5 tons of force and the last two 10 tons. After the final press, the stainless steel plates were immediately submersed in an ice water bath to quench cool the films. Films were then isolated and dried in a vacuum oven overnight before use.

Thermogravimetric analysis (TGA) was conducted using TA Instruments Q50® from 25 to 600° C. at a heating rate of 10° C./min.

Dynamic mechanical analysis (DMA) was conducted on a TA Instruments Q800® dynamic mechanical analyzer in tension and 3-point bending mode. Tension was conducted at a frequency of 1 Hz; oscillatory amplitude of 15 μm; and static force of 0.01 N. Use temperature ramp was 3° C./min. Polymers were compression molded using a 406 μm (16 mil) stainless steel shim. Controlled force 3-point bending was conducted at a static force set to equal 455 kPa or 1.82 MPa stress, in accordance with ASTM D648. The static force was calculated according to TA Instruments protocol for HDT measurements. Bars were injection molded on a BoyXS™ injection molding machine using a mold temperature of 45° F., barrel temperatures from 275° C. to 200° C.; holding pressure 6.89 MPa (1000 psi); and cycle time ~60 s. The bars were used for measurements without additional conditioning.

Rheological analysis was conducted on a TA Instruments DISCOVERY Hybrid Rheometer-2 using disposable 25 mm diameter aluminum parallel plates Melt stability measurements were run in the presence of air at 275° C. with a constant 1 Hz shear and constant nominal strain of 1.25 percent, which falls within the linear viscoelastic range determined using strain sweeps. Zero-shear viscosity measurements were acquired at multiple temperatures over a range of shear rates ranging from 0.1 to 100 Hz.

Tensile testing was conducted on a MTS Model No. 4204 with a 1 kN load cell and a crosshead motion rate of 10 mm/min with an initial grip-to-grip separation of 25.4±2.0 mm and on an INSTRON® 5500R with a crosshead motion rate of 10 mm/min and an initial grip separation of 25.4±2.0 mm. Tensile modulus data were determined on the MTS Model No. 4204 using an Epsilon 3442 miniature extensometer during the first 5 percent strain.

Flexural testing was conducted on an MTS Model No 4204 tester with a 1 kN load cell and a crosshead motion rate of 1.2-1.4 mm/min in accordance with ASTM D790 specifications.

The 4,4'BB and 3,4'BB were dried under reduced pressure at 35° C. overnight prior to use. A solution of 0.02-0.06 g/mL titanium tetraisopropoxide in anhydrous 1-butanol was used. The melt transesterification-polycondensation synthesis produced copolyesters with varying bibenzoate incorporation and a mixture of diols with altered spacing or architecture. In these examples, EG and or CHDM diols were employed as comonomers to evaluate the influence a selection of the diol may have on the rigidity, aromaticity, and spacer length of the bibenzoate-incorporated copolymers. The selection of the diol, e.g., CHDM, was employed to determine the effect of alicyclic monomers within the copolymers. The effects of the selection of the comonomers on the thermal, viscoelastic, barrier, stability, and mechanical properties, were also evaluated.

Synthesis of poly(4,4'BB-co-3,4'BB)-EG on a 20 g Scale

Reactions were conducted in a dry 100 mL round-bottomed flask equipped with an overhead stirrer, nitrogen inlet, and distillation apparatus. All monomers were introduced to the flask in the desired proportions, e.g., for synthesis of 25-4,4'BB-75-3,4' BB-EG, the monomers were EG (7.63 g, 1.5 mol eq.) at a 50% molar excess, 4,4'BB (5.54 g, 0.25 mol eq.), and 3,4'BB (16.62 g, 0.75 mol eq.). Titanium tetraisopropoxide (40 ppm) was added to the flask and used to catalyze the reaction. Degassing with vacuum and purging with nitrogen three times allowed the reaction to proceed oxygen free. The flask was then submerged in a heated bath and the reaction allowed to proceed at 170° C. for 1 h, at 200° C. for 1 h, at 220° C. for 2 h, and at 275° C. for 1 h, all while under constant stirring at 75 rpm and nitrogen purge. Vacuum was then applied until a pressure of 13-27 Pa (0.1-0.2 mm-Hg) was achieved, and the reaction stirred at 275° C. for 1 h. The viscosity of the polymerizing clear melt increased as the polymerization progressed over time. The flask was removed from the heated bath and cooled to room temperature. The resulting polymer was removed from the flask and used without further purification.

Synthesis of poly(4,4'BB-co-3,4'BB)-EG on a 150 g Scale

Approximately 150 g of poly(4,4'BB-co-3,4'BB)-EG were synthesized using the same molar equivalents and reaction conditions as outlined above for the 20 g batches. The procedure was modified after the application of vacuum to a pressure of 1.3-27 Pa (0.1-0.2 mm Hg), by stirring the reaction for 1.5 h at 275° C., and then increasing the temperature to 285° C. while maintaining the vacuum and stirring for an additional 1.5 h.

Synthesis of poly(4,4'BB-co-3,4'BB)-EG-co-CHDM (20 g)

All polymers were synthesized consistent with the above reaction conditions utilized to produce poly(4,4'BB-co-3, 4'BB)-EG (20 g) except as noted. An inventive polymer having a target EG:CHDM ratio of 65:35 was produced using 0.975 mole equivalents of EG combined with 0.37 mole equivalents of CHDM. An inventive polymer having a target EG:CHDM ratio of 35:65 was produced using 0.70 mole equivalents of EG combined with 0.67 mole equivalents of CHDM.

Synthesis of Branched
poly(4,4'BB-co-3,4'BB)-EG+x-TMA (20 g)

All polymers were synthesized using the same molar equivalents and reaction conditions as the poly(4,4'BB-co-3,4'BB)-EG (20 g) except that TMA (0.1-0.5 mol %, repeating units basis) was added to the reaction flask with the other monomers.

Molecular Weight Characterization:

The molecular weight and polydispersity were confirmed using the THF-soluble 3,4'BB-EG. As seen in FIG. 1, both the 20 g and 150 g scale batches yielded similar elution profiles. The non-uniformity of the peak shapes can be explained by the presence of low molecular weight cyclic polymer molecules, which are common in step-growth polymerizations and lead to a skewed elution profile at higher elution times. The molecular weights of both 3,4'BB-EG polymers were similar, and the polydispersity close to the expected step-growth polymerization value of 2, as seen in Table 1.

TABLE 1

Molecular weight characterization of small (20 g) and large (150 g) scale reactions. Molecular weight is absolute using a dn/dc value of 0.212.

| Sample | $M_n$ (g/mol) | $M_w$ (g/mol) | $M_w/M_n$ |
|---|---|---|---|
| 3,4'BB-EG (20 g scale) | 51k | 89k | 1.75 |
| 3,4'BB-EG (150 g scale) | 50k | 87k | 1.75 |

Figure 2:
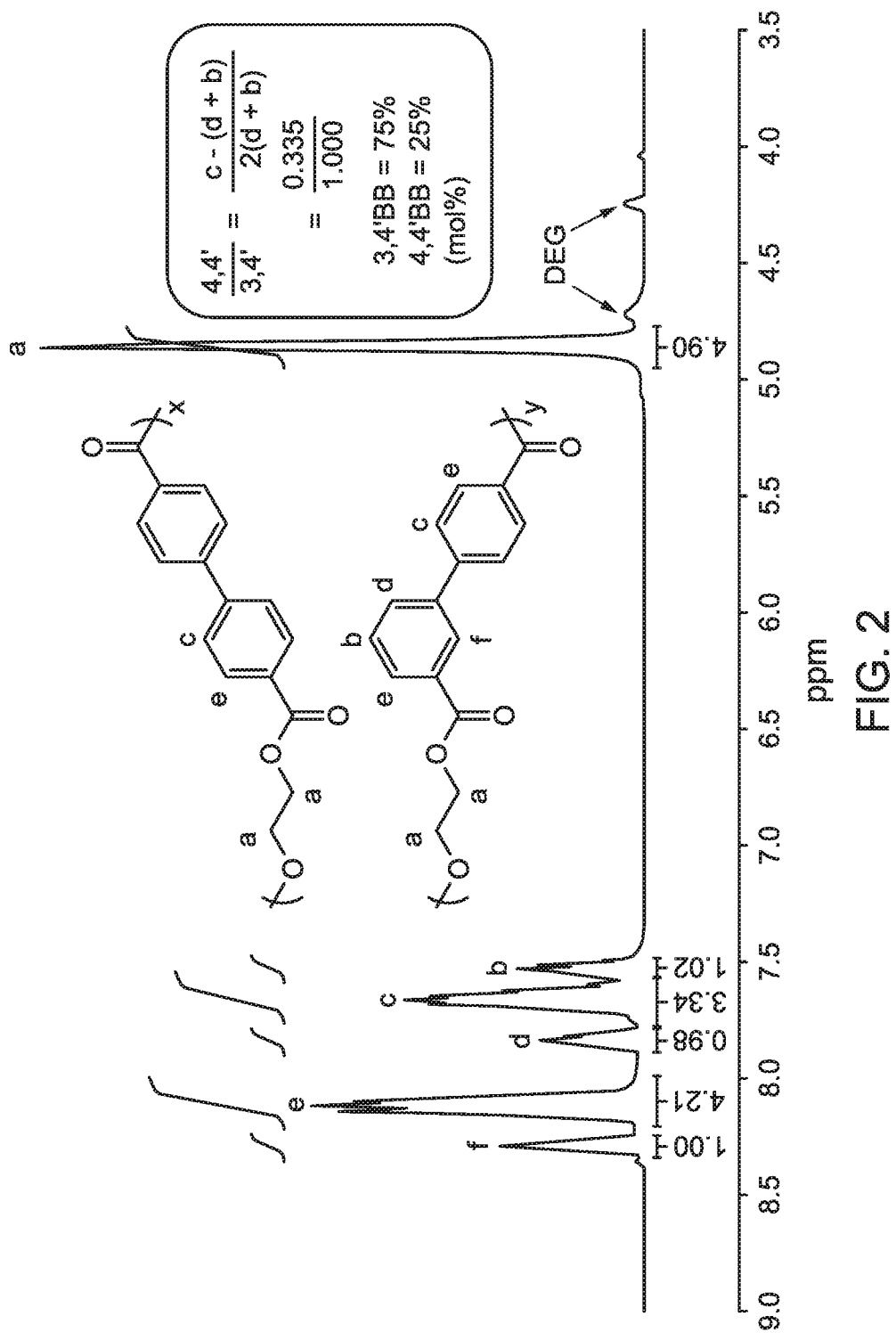
FIG. 2 is a $^1$H NMR spectrum of a copolyester according to embodiments of the invention.

Bibenzoate Incorporation:

$^1$H NMR confirmed bibenzoate incorporation, FIG. 2 is a $^1$H NMR spectrum of 25-4,4'BB-75-3,4'BB-EG copolymer.

Figure 3:
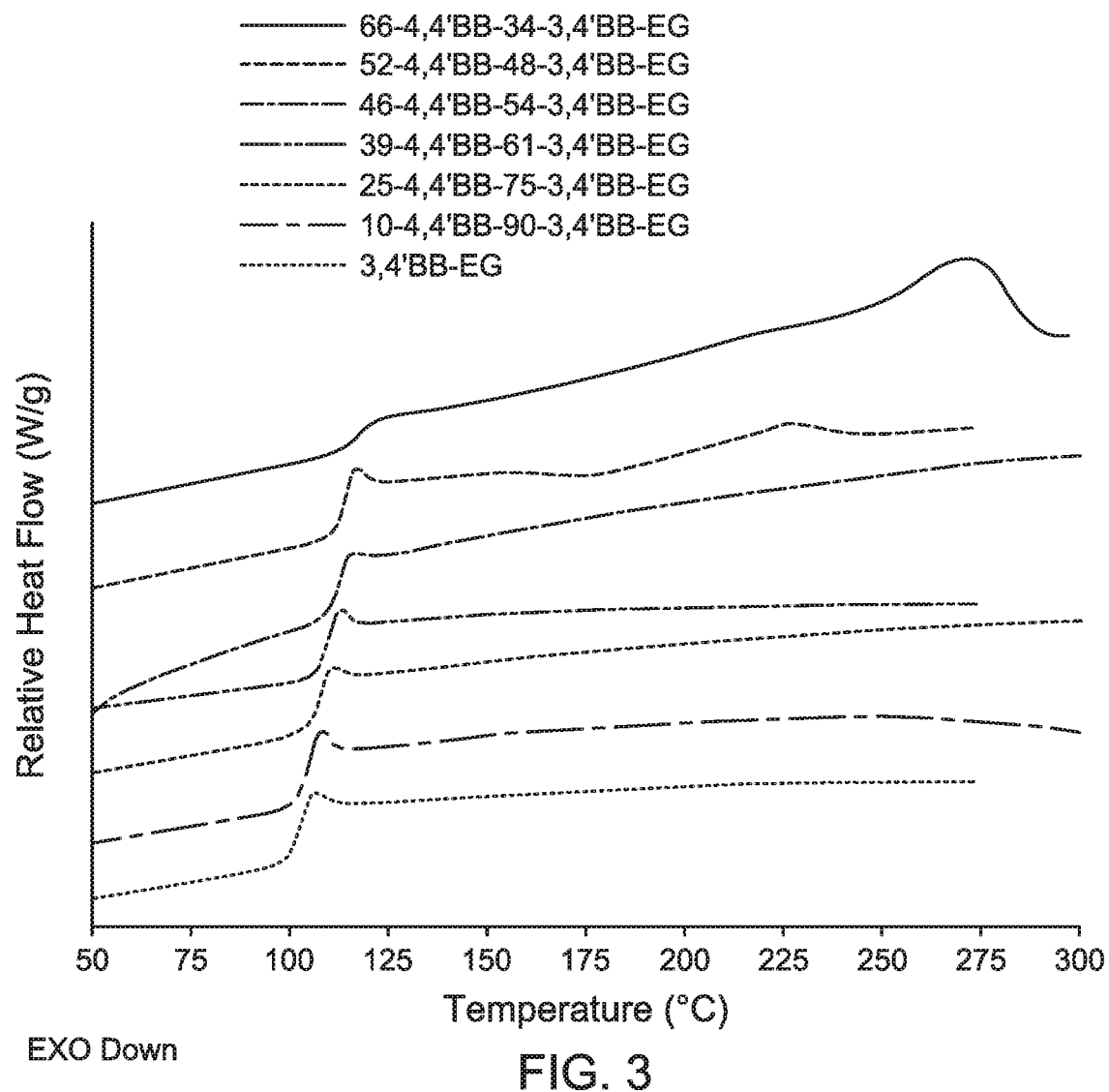
FIG. 3 is a plot of relative heat flow as a function of temperature according to differential scanning calorimetry analysis (DSC) of a series of copolyesters according to embodiments of the invention.

DSC Analysis:

As shown in FIG. 3, DSC analysis of poly(4,4'BB-co-3,4'BB)-EG samples afforded thermal transitions which increased with higher 4,4'BB incorporation from 0 mole percent 4,4'BB (3,4'BB-EG) up to 66 mole percent 4,4'BB (66-4,4'BB-34-3,4'BB-EG), with the glass transition temperature (Tg) Increasing with an increase in the amount of 4,4'BB incorporated into the copolyesters. Embodiments having 4,4'BB incorporation ranging from 0 percent to 46 mole percent showed no crystallinity; however, above about 50 mole percent 4,4'BB, a crystallization exotherm and a melting endotherm appeared in the DSC trace, indicating the presence of crystallinity in the copolymers, and melting temperatures above 230° C. continuing to increase with additional 4,4'BB incorporation. The thermal transitions including Tg, Tc, and Tm are listed in Table 2.

TABLE 2

Thermal Transitions.

| Sample | Glass Transition Temperature, $T_g$ (° C.) | Crystallization Temperature, $T_c$ (° C.) | Melting Temperature, $T_m$ (° C.) |
|---|---|---|---|
| 3,4'BB-EG | 104 | ND[1] | ND |
| 10-4,4'BB-90-3,4'BB-EG | 105 | ND | ND |
| 25-4,4'BB-75-3,4'BB-EG | 108 | ND | ND |
| 39-4,4'BB-61-3,4'BB-EG | 110 | ND | ND |
| 46-4,4'BB-54-3,4'BB-EG | 113 | ND | ND |
| 52-4,4'BB-48-3,4'BB-EG | 114 | 176 | 232 |
| 66-4,4'BB-34-3,4'BB-EG | 117 | ND | 272 |

ND = Not detected

Figure 4:
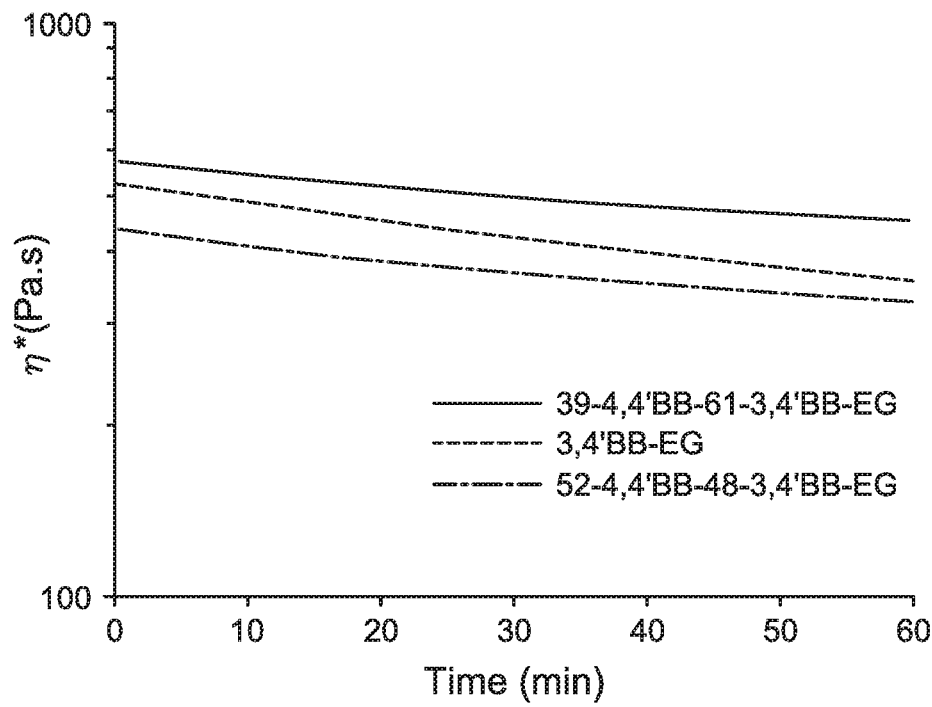
FIG. 4 is a plot of the complex viscosity as a function of time to determine the melt stability of copolyesters according to embodiments of the invention.

Polymer Processing Simulation:

Polymer processing conditions were simulated using a rheometer. Complex viscosity was used as a proxy for melt stability, and was determined using parallel plates, 1.25 percent strain, and 1 Hz frequency at 275° C. in the presence of air. As seen in FIG. 4, the copolyesters maintained acceptable complex viscosity (melt stability) over a 60-minute run, confirming a low level of degradation and chain scission, thus allowing for polymer processing at high temperatures.

Figure 5:
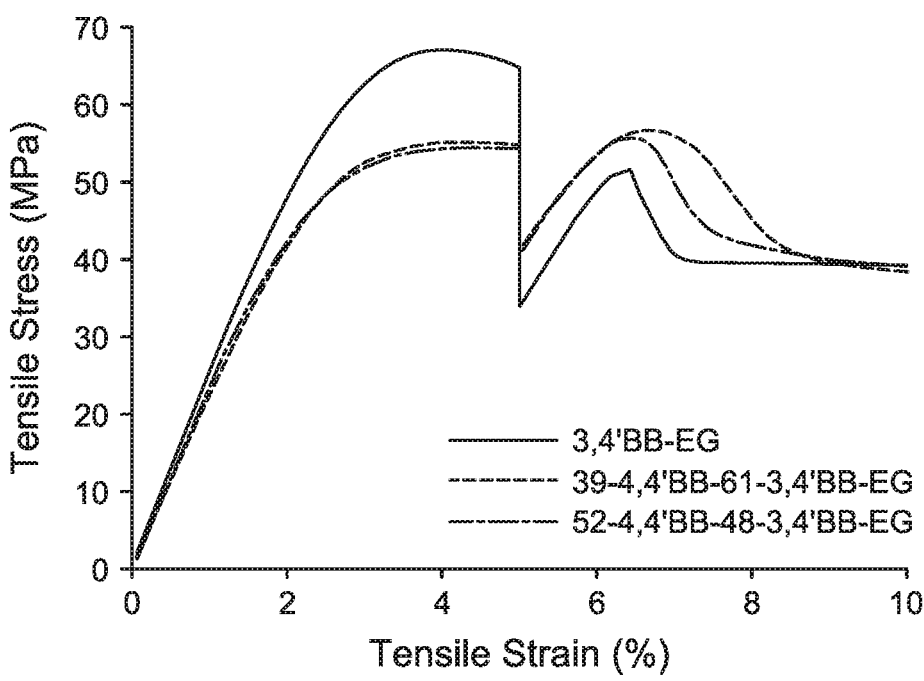
FIG. 5 is a plot of tensile stress versus strain using an extensometer to determine the tensile modulus of copolyesters according to embodiments of the invention.
Figure 6:
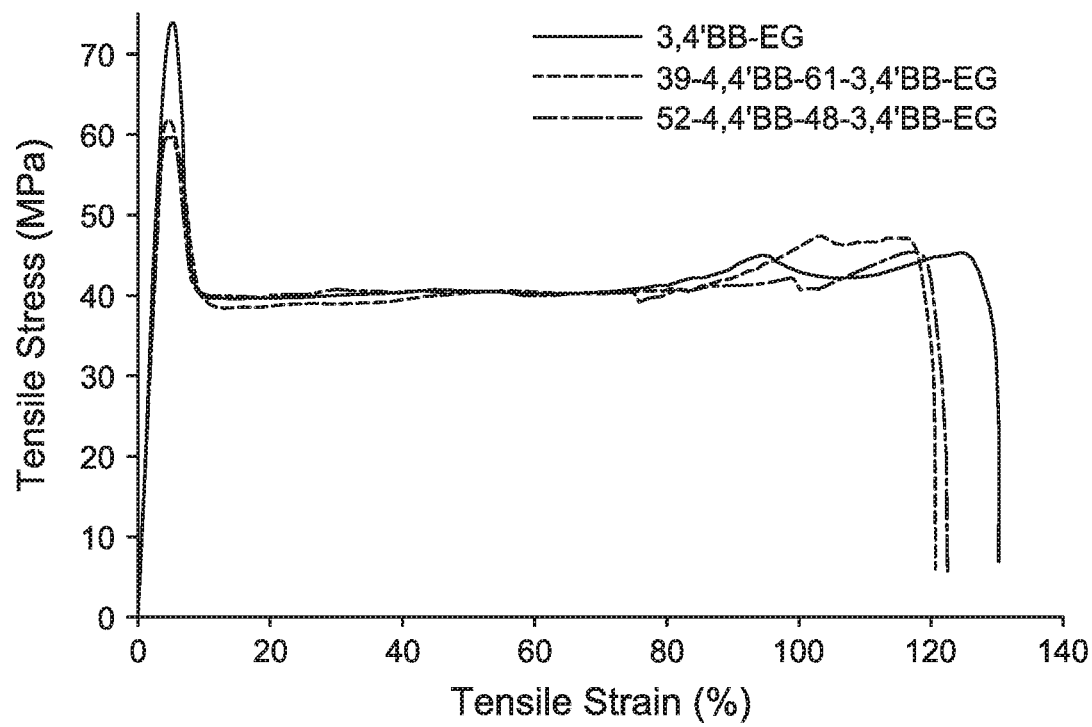
FIG. 6 is a plot of tensile stress versus strain to determine the yield stress, necking stress and elongation at break of copolyesters according to embodiments of the invention.
Figure 7:
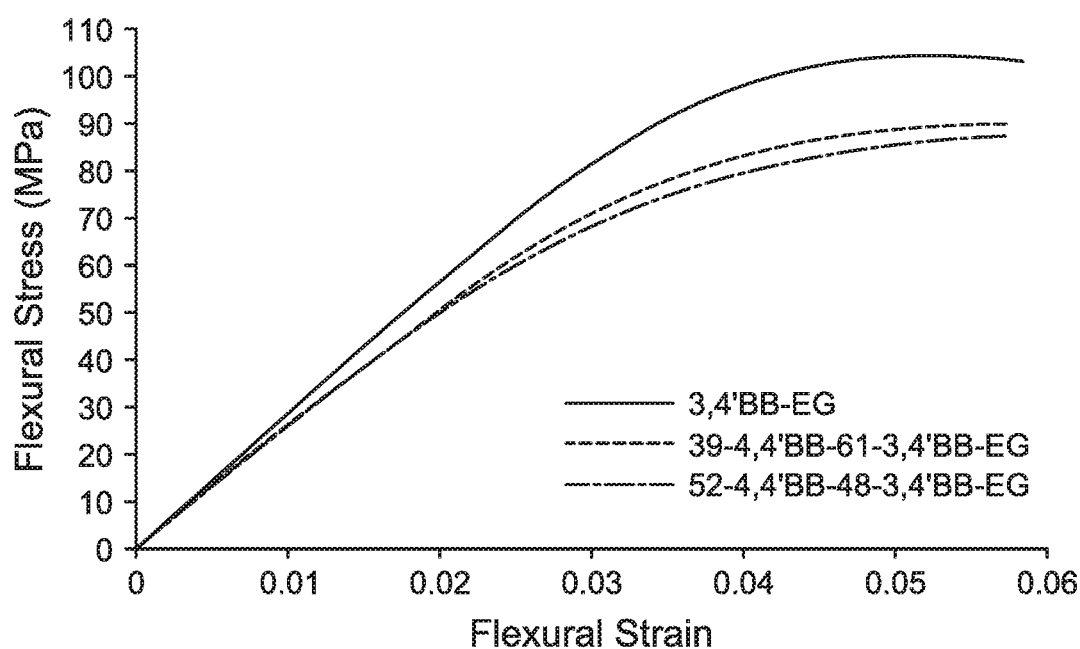
FIG. 7 is a plot of flexural stress as a function of flexural strain to determine the flexural modulus of copolyesters according to embodiments of the invention.

Tensile Testing:

Compression molded specimens were subjected to tensile testing. As shown in FIG. 5, a 5 percent strain preloading interfered with the yield stress measurement. Accordingly, the yield stress and elongation at break were recorded without the use of an extensometer. These data are shown in FIG. 6. Table 3 lists the tensile modulus, yield stress and elongation at break for an average of 3-4 analyses. The 3,4'BB-EG sample had the highest modulus, yield stress, and elongation at break. Increasing 4,4'BB content showed a decrease in all tensile properties.

TABLE 3

Tensile modulus, tensile strength and elongation decrease with increasing 4,4'BB isomer incorporations.

| Sample | Tensile Modulus (GPa) | Tensile Strength (MPa) | Elongation to Break (% Strain) |
|---|---|---|---|
| 3,4'BB-EG | 2.69 ± 0.28 | 74.4 ± 0.25 | 163 ± 39 |
| 39-4,4'BB-61-3,4'BB-EG | 2.36 ± 0.16 | 62.3 ± 0.66 | 142 ± 35 |
| 52-4,4'BB-48-3,4'BB-EG | 2.34 ± 0.026 | 60.1 ± 0.25 | 109 ± 25 |

As seen in FIG. 6, all samples experience strain-induced hardening. Additional flexural testing data are shown in Table 4.

TABLE 4

Flexural modulus and flexural strength decrease with increasing 4,4'BB isomer incorporation. Flexural modulus values are within 10% of the tensile values, while the flexural strength is about 1.5X tensile strength.

| Sample | Flexural Modulus (GPa) | Flexural Strength (MPa) |
|---|---|---|
| 3,4'BB-EG | 2.89 ± 0.070 | 104 ± 0.071 |
| 39-4,4'BB-61-3,4'BB-EG | 2.64 ± 0.036 | 88.8 ± 0.36 |
| 52-4,4'BB-48-3,4'BB-EG | 2.50 ± 0.073 | 84.7 ± 0.77 |

As these data show, the flexural modulus was within 10 percent of the tensile modulus for each sample and the flexural strength was about 1.5 times the tensile strength.

These data were acquired according to a modified ASTM D638 procedure using 0.4 mm films, the flexural strength was determined at the maximum stress within the first 5 percent strain or at the 5 percent strain if the stress was still increasing, as seen in FIG. 5.

Heat Distortion:

Thermomechanical analysis was performed using a 3-point bending geometry. The heat distortion temperature (HDT) was measured using a 2° C./min heating rate. These data are listed in Table 5.

TABLE 5

Heat distortion temperature analysis by DMA.

| Sample | HDT, 0.455 MPa (° C.) | HDT, 1.82 MPa (° C.) |
|---|---|---|
| 3,4'BB-EG | 89 | 79 |
| 39-4,4'BB-61-3,4'BB-EG | 95 | 81 |
| 52-4,4'BB-48-3,4'BB-EG | 95 | 81 |

As these data show, the HDT increased along with the increased incorporation of 4,4'BB into the copolymer. This property of these embodiments is similar to the increased $T_g$ trend observed in FIG. 3. The HDT under 455 kPa of stress consistently gives values of approximately 20° C. below the measured glass transition temperature, $T_g$.

Figure 8:
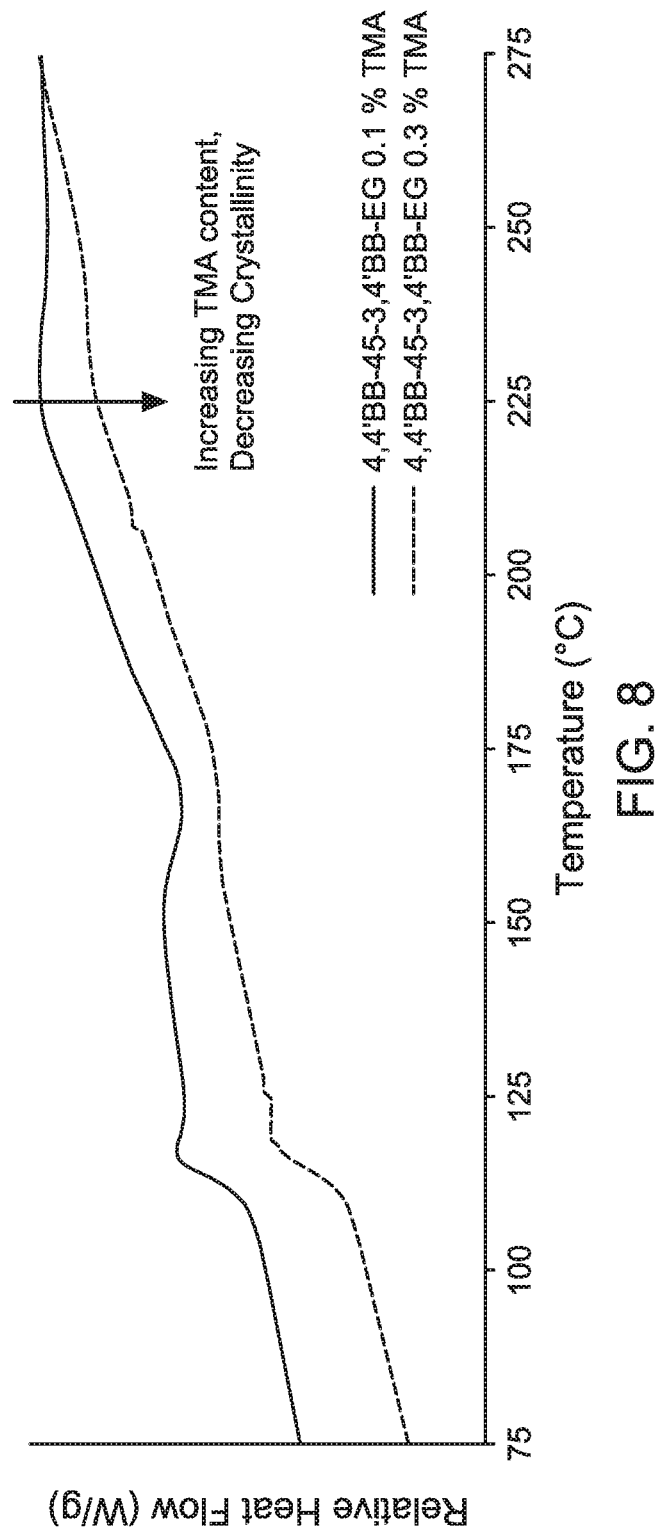
FIG. 8 is a plot of relative heat flow as a function of temperature from DSC of a series of copolyesters comprising TMA to induce branching, according to embodiments of the invention.

Branched 4,4'BB3,4'-BB-EG Copolyesters:

Copolymers comprising long-chain branching via the incorporation of trimellitic anhydride (TMA) were evaluated to determine the effect of branching on the properties of the copolymers, including crystallinity and crystallization rate. The effects of branching on processing conditions such as zero shear viscosity were also evaluated. The highest level of trifunctional monomer (TMA) employed, in these examples (0.5 mol % TMA, repeating units basis) did not result in crosslinking. As shown in FIG. 8, reductions in the crystallization exotherm and melting endotherm were observed as the amount of trifunctional monomer was increased from 0.1 to 0.3 mole percent. This slight increase in branching suggests hindrance of chain packing, thereby decreasing the amount of crystallinity detected via DSC analysis.

Figure 9:
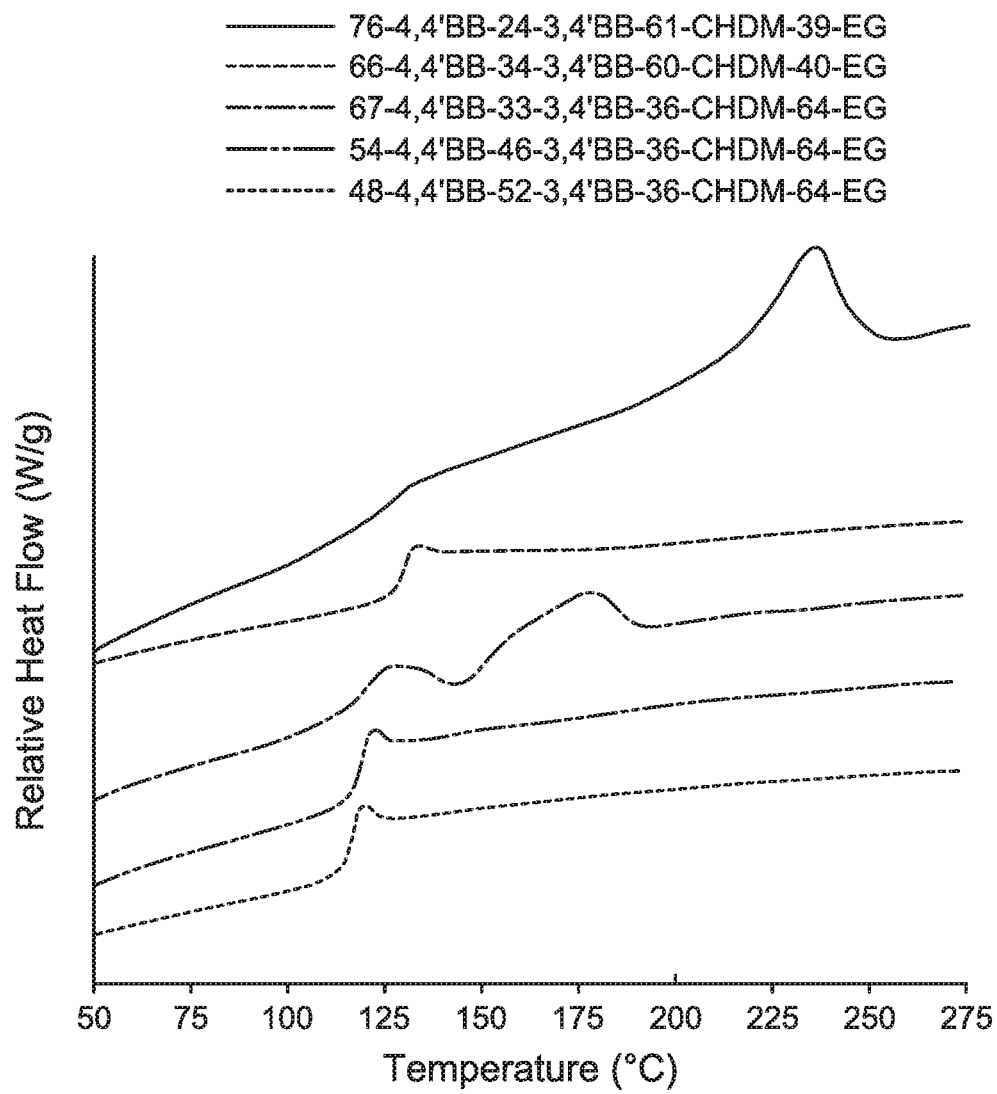
FIG. 9 is a plot of relative heat flow as a function of temperature from DSC of a series of copolyesters according to embodiments of the invention.

4,4'BB/3,4'BB-CHDM Copolyesters:

To evaluate the effect of a more rigid, bulky diol on the crystallizability and thermal transitions of the 4,4'BB/3,4'BB copolymers, varying amounts of 1,4-cyclohexanedimethanol (CHDM) in the diol component were used. These CHDM copolymers were then subjected to DSC analysis as shown in FIG. 9. As these data show, incorporation of CHDM into the copolymers resulted in an increase in the amorphous character of the copolyesters and enhanced glass transition temperatures. As the data in Table 6 show, a feed ratio of 70-4,4'BB-30-3,4'BB-65-CHDM-35-EG unexpectedly yielded an amorphous copolyester with a surprisingly high glass transition of 130° C.

TABLE 6

Thermal characterization of high 4,4'BB incorporated copolyesters with CHDM.

| Sample (Feed Ratio) | Glass Transition Temperature, $T_g$ (° C.) | Melting Temperature, $T_m$ (° C.) |
|---|---|---|
| 50-4,4'BB-50-3,4'BB-35-CHDM-65-EG | 116 | ND |
| 60-4,4'BB-40-3,4'BB-35-CHDM-65-EG | 119 | ND |
| 70-4,4'BB-30-3,4'BB-35-CHDM-65-EG | 121 | 178 |
| 70-4,4'BB-30-3,4'BB-65-CHDM-35-EG | 130 | ND |
| 80-4,4'BB-20-3,4'BB-65-CHDM-35-EG | 127 | 236 |

ND = Not detected

Accordingly, as these data show, copolyesters according to embodiments disclosed herein have improved properties including improved glass transition temperatures above 100° C. in combination with elongation at break values of greater than 85 percent. These polymers may also be amorphous, indicating suitability for use in injection molding of clear articles. In addition, polymers may be produced which have a glass transition temperature within a particular range by selecting the proportions of different types of diol employed. Likewise, polymers having crystalline character e.g., semi-crystalline polymers may be produced by utilizing, and selecting diacid components having amounts of 4,4' BB in excess of 50 mole percent.

Although only a few example embodiments have been described in detail above, those skilled in the art will readily appreciate that many modifications are possible in the example embodiments without materially departing from this invention. Accordingly, all such modifications are intended to be included within the scope of this invention as defined in the following claims. It is the express intention of the applicant not to invoke 33 U.S.C. § 112(f) for any limitations of any of the claims herein, except for those in which the claim expressly uses the words 'means for' together with an associated function and without any recitation of structure. The priority document is incorporated herein by reference.

What is claimed is:

1. A copolyester comprising:
   a diol component comprising from about 10 to 90 mole percent ethylene glycol and from about 90 to 10 mole percent 1,4-cyclohexanedimethanol, based on the total moles of the diol component in the copolyester; and
   a diacid component comprising 4,4'-biphenyl dicarboxylate and 3,4'-biphenyl dicarboxylate, wherein the diacid component comprises from about 50 to 90 mole percent of the 4,4'-biphenyl dicarboxylate and from about 50 to 10 mole percent of the 3,4' biphenyl dicarboxylate, based on the total moles of the diacid component in the copolyester;
   wherein the copolyester has an essentially amorphous morphology and a glass transition temperature equal to or greater than about 110° C. determined by differential scanning calorimetry (DSC) analysis from a second heating ramp at a heating rate of 10° C./min; or
   wherein the copolyester has a semicrystalline morphology, a melting temperature of equal to or less than 250° C. determined by DSC analysis from a second heating ramp at a heating rate of 10° C./min, and a glass transition temperature equal to or greater than 120° C. determined by DSC analysis from a second heating ramp at a heating rate of 10° C./min.

2. The copolyester of claim 1, further comprising a branching agent.

3. The copolyester of claim 1, further comprising an average number molecular weight of equal to or greater than about 20,000 g/mol and a polydispersity from about 1.8 to 3.

4. The copolyester of claim 1, comprising a glass transition temperature equal to or greater than about 115° C., determined by differential scanning calorimetry (DSC) analysis from a second heating ramp at a heating rate of 10° C./min.

5. The copolyester of claim 4, comprising a melting temperature of less than or equal to about 240° C., determined by differential scanning calorimetry (DSC) analysis from a second heating ramp at a heating rate of 10° C./min.

6. A copolyester, comprising:
 a diol component comprising from about 10 to 90 mole percent ethylene glycol and from about 90 to 10 mole percent 1,4-cyclohexanedimethanol, based on the total moles of the diol component in the copolyester; and
 a diacid component comprising 4,4'-biphenyl dicarboxylate and 3,4'-biphenyl dicarboxylate, wherein the diacid component comprises from about 50 to 80 mole percent of the 4,4'-biphenyl dicarboxylate and from about 50 to 20 mole percent of the 3,4' biphenyl dicarboxylate, based on the total moles of the diacid component in the copolyester;
 an essentially amorphous morphology; and
 a glass transition temperature equal to or greater than about 110° C. determined by differential scanning calorimetry (DSC) analysis from a second heating ramp at a heating rate of 10° C./min;
 optionally from about 0.05 to 0.5 mole percent of a branching agent, based on the total moles of repeating units in the copolyester.

7. A copolyester, comprising:
 a diol component comprising from about 10 to 90 mole percent ethylene glycol and from about 90 to 10 mole percent 1,4-cyclohexanedimethanol, based on the total moles of the diol component in the copolyester; and
 a diacid component comprising 4,4'-biphenyl dicarboxylate and 3,4'-biphenyl dicarboxylate, wherein the diacid component comprises from about 50 to 90 mole percent of the 4,4'-biphenyl dicarboxylate and from about 50 to 10 mole percent of the 3,4' biphenyl dicarboxylate, based on the total moles of the diacid component in the copolyester;
 a semicrystalline morphology;
 a melting temperature of less than or equal to 250° C., determined by differential scanning calorimetry (DSC) analysis from a second heating ramp at a heating rate of 10° C./min; and
 a glass transition temperature equal to or greater than 120° C. determined by DSC analysis.

8. The copolyester of claim 1, comprising:
 an elongation at break of equal to or greater than about 85 percent, determined according to ASTM D638; and/or
 a tensile strength of equal to or greater than about 60 MPa determined according to ASTM D638; and/or
 a tensile modulus of equal to or greater than about 1700 MPa, determined according to ASTM D638; and/or
 a flexural strength of equal to or greater than about 80 MPa, determined according to ASTM D790; and/or
 a flexural modulus of equal to or greater than about 2500 MPa, determined according to ASTM D790; and/or
 a heat distortion temperature at 455 kPa of equal to or greater than about 90° C. determined according to ASTM D648; and/or
 a heat distortion temperature at 1.82 MPa of equal to or greater than about 70° C., determined according to ASTM D648;
 or a combination thereof.

9. The copolyester of claim 6, comprising:
 wherein the diol component consists essentially of ethylene glycol and from about 20 to 80 mole percent 1,4-cyclohexanedimethanol, based on the total moles of the diol component in the copolyester;
 a wherein the diacid component consists essentially of from about 50 to 80 mole percent of 4,4'-biphenyl dicarboxylate, and from about 50 to 20 mole percent of 3,4'-biphenyl dicarboxylate, based on the total moles of the diacid component in the copolyester;
 optionally from about 0.1 to 0.5 mole percent trimellitic or pyromellitic anhydride, based on the total moles of repeating units in the copolyester;
 a glass transition temperature equal to or greater than about 115° C. determined by differential scanning calorimetry (DSC) analysis from a second heating ramp at a heating rate of 10° C./min; and
 one or more of the properties selected from:
  an elongation at break greater than about 85 percent determined according to ASTM D638; and/or
  a tensile strength of equal to or greater than about 60 MPa determined according to ASTM D638; and/or
  a tensile modulus of equal to or greater than about 1700 MPa determined according to ASTM D638; and/or
  a flexural strength of equal to or greater than about 80 MPa determined according to ASTM D790; and/or
  a flexural modulus of equal to or greater than about 2500 MPa determined according to ASTM D790; and/or
  a heat distortion temperature at 455 kPa of equal to or greater than about 90° C. determined according to ASTM D648; and/or
  a heat distortion temperature at 1.82 MPa of equal to or greater than about 70° C. determined according to ASTM D648.

10. The copolyester of claim 9, wherein the 1,4-cyclohexanedimethanol comprises from about 30 to 80 mole percent of the diol component, and the glass transition temperature is equal to or greater than about 120° C.

11. The copolyester of claim 7, comprising:
 wherein the diol component consists essentially of ethylene glycol and from about 20 to 80 mole percent 1,4-cyclohexanedimethanol, based on the total moles of the diol component in the copolyester;
 wherein the diacid component consists essentially of from about 60 to 90 mole percent of 4,4'-biphenyl dicarboxylate, and from about 40 to 10 mole percent of 3,4'-biphenyl dicarboxylate, based on the total moles of the diacid component in the copolyester;
 a melting temperature less than or equal to about 240° C., determined by differential scanning calorimetry (DSC) analysis from a second heating ramp at a heating rate of 10° C./min; and
 one or more of the properties selected from:
  an elongation at break greater than about 85 percent determined according to ASTM D638; and/or
  a tensile strength of equal to or greater than about 60 MPa determined according to ASTM D638; and/or
  a tensile modulus of equal to or greater than about 1700 MPa determined according to ASTM D638; and/or
  a flexural strength of equal to or greater than about 80 MPa determined according to ASTM D790; and/or a flexural modulus of equal to or greater than about 2500 MPa determined according to ASTM D790; and/or a heat distortion temperature at 455 kPa of equal to or greater than about 90° C. determined according to ASTM D648; and and/or a heat distortion temperature at 1.82 MPa of equal to or greater than about 70° C. determined according to ASTM D648.

12. The copolyester of claim 1, comprising branching agent in an amount of from about 0.001 to 1 mole percent, based on the total moles of repeating units in the copolyester.

13. The copolyester of claim 1, wherein the glass transition temperature is equal to or greater than about 120° C., determined by DSC analysis from a second heating ramp at a heating rate of 10° C./min.

14. The copolyester of claim 13, comprising a melting temperature less than or equal to about 240° C., determined by DSC analysis from a second heating ramp at a heating rate of 10° C./min.

15. A shaped article comprising the copolyester according to claim 1.

16. The article of claim 15, wherein the copolyester is in the form of a fiber, a nonwoven fabric, a film, or a molded article.

17. A method, comprising:
contacting (i) a diol component comprising ethylene glycol and 1,4-cyclohexanedimethanol, with (ii) a diacid component comprising 4,4'-biphenyl dicarboxylic acid or ester producing equivalent thereof and 3,4'-biphenyl dicarboxylic acid or ester producing equivalent thereof, in the presence of (iii) a catalyst; and forming a copolyester comprising the ethylene glycol, 1,4-cyclohexanedimethanol, 4,4'-biphenyl dicarboxylic acid or ester producing equivalent thereof and 3,4'-biphenyl dicarboxylic acid or ester producing equivalent thereof;

wherein the diol component in the copolyester comprises ethylene glycol and from about 10 to 90 mole percent 1,4 cyclohexanedimethanol, based on the total moles of the diol component in the copolyester;

wherein the diacid component in the copolyester comprises from about 50 to 90 mole percent of 4,4'-biphenyl dicarboxylate, and from about 50 to 10 mole percent of 3,4' biphenyl dicarboxylate, based on the total moles of the diacid component in the copolyester;

wherein the copolyester has an essentially amorphous morphology and a glass transition temperature equal to or greater than about 110° C. determined by differential scanning calorimetry (DSC) analysis from a second heating ramp at a heating rate of 10° C./min; or wherein the copolyester has a semicrystalline morphology, a melting temperature of equal to or less than 250° C., determined by DSC analysis from a second heating ramp at a heating rate of 10° C./min, and a glass transition temperature equal to or greater than 120° C. determined by DSC analysis from a second heating ramp at a heating rate of 10° C./min.

18. The method of claim 17, wherein the contacting further comprises a branching agent wherein the copolyester comprises branching and or an amorphous morphology.

19. The method of claim 17, wherein a proportion of the 1,4-cyclohexanedimethanol in the diol component, and a proportion of the 4,4'-biphenyl dicarboxylic acid or ester producing equivalent thereof in the diacid component, are selected wherein the copolyester comprises:

an essentially amorphous morphology; and a glass transition temperature equal to or greater than about 115° C., determined by differential scanning calorimetry (DSC) analysis from a second heating ramp at a heating rate of 10° C./min.

20. The method of claim 17, wherein a proportion of the 1,4-cyclohexanedimethanol in the diol component, and a proportion of the 4,4'-biphenyl dicarboxylic acid or ester producing equivalent thereof in the diacid component, are selected wherein the copolyester comprises:
a semicrystalline morphology;
a melting temperature less than or equal to 250° C. determined by differential scanning calorimetry (DSC) analysis from a second heating ramp at a heating rate of 10° C./min; and
a glass transition temperature equal to or greater than 120° C., determined by DSC analysis from a second heating ramp at a heating rate of 10° C./min.

21. The method of claim 17, further comprising:
selecting relative proportions of the diacid component wherein the copolyester comprises from about 50 to 80 mole percent 4,4'-biphenyl dicarboxylic acid or ester producing equivalent thereof and from about 50 to 20 mole percent 3,4'-biphenyl dicarboxylic acid or ester producing equivalent thereof, based on the total moles of the diacid components;
wherein the selections of the relative proportions of the diol and diacid components are made to control morphology, glass transition temperature, melting temperature and/or toughness.

22. The method of claim 17, wherein:
the relative proportions of the diol component comprise from about 20 to 80 mole percent CHDM, based on the total moles of the diol component in the copolyester;
the relative proportions of the diacid component comprises from about 50 to 80 mole percent 4,4'-biphenyl dicarboxylic acid or ester producing equivalent thereof, and from about 50 to 20 mole percent 3,4'-biphenyl dicarboxylic acid or ester producing equivalent thereof, based on the total moles of the diacid component; and
the copolyester comprises: an essentially amorphous morphology and a glass transition temperature equal to or greater than about 120° C., as determined by differential scanning calorimetry (DSC) analysis from a second heating ramp at a heating rate of 10° C./min.

23. The method of claim 17, wherein:
the relative proportions of the diol component comprise from about 20 to 80 mole percent 1,4-cyclohexanedimethanol, based on the total moles of the diol component in the copolyester;
the relative proportions of the diacid component comprises from about 50 to 90 mole percent 4,4'-biphenyl dicarboxylic acid or ester producing equivalent thereof, and from about 50 to 10 mole percent 3,4'-biphenyl dicarboxylic acid or ester producing equivalent thereof, based on the total moles of the diacid component; and
the copolyester comprises: a semicrystalline morphology, a melting temperature of less than or equal to about 230° C., and a glass transition temperature equal to or greater than 120° C., as determined by differential scanning calorimetry (DSC) analysis from a second heating ramp at a heating rate of 10° C./min.

24. A method to control the morphology, glass transition temperature, melting temperature and/or toughness of a copolyester, comprising:
contacting (i) a diacid component comprising from about 50 to 90 mole percent 4,4'-biphenyl dicarboxylic acid or ester producing equivalent thereof, from about 50 to 10 mole percent 3,4'-biphenyl dicarboxylic acid or ester producing equivalent thereof, based on the total moles of the diacid component in the copolyester, with (ii) a diol component comprising from 10 to 90 mole percent 1,4-cyclohexanedimethanol and from about 90 to 10 mole percent ethylene glycol, based on the total moles of the diol component in the copolyester, and (iii) optionally a multifunctional carboxylic acid or ester producing equivalent thereof, and if the multifunctional carboxylic acid or ester is present, in the presence of (iv) a catalyst; and selecting a proportion of the 1,4-cyclohexanedimethanol in the diol component, a proportion of the 4,4'-biphenyl dicarboxylic acid or ester producing equivalent thereof in the diacid component, and a proportion of the multifunctional carboxylic acid or ester producing equivalent thereof in total repeating units, to produce a copolyester comprising:

wherein the copolyester has an essentially amorphous morphology and a glass transition temperature equal to or greater than about 110° C. determined by differential scanning calorimetry (DSC) analysis from a second heating ramp at a heating rate of 10° C./min; or wherein the copolyester has a semicrystalline morphology, a melting temperature of equal to or less than 250° C., determined by DSC analysis from a second heating ramp at a heating rate of 10° C./min, and a glass transition temperature equal to or greater than 120° C. determined by DSC analysis from a second heating ramp at a heating rate of 10° C./min.

25. The method of claim 24 wherein:
the diol component comprises from about 20 to 80 mole percent 1,4-cyclohexanedimethanol;
the diacid component comprises from about 50 to 80 mole percent 4,4'-biphenyl dicarboxylic acid or ester producing equivalent thereof;
the morphology is essentially amorphous; and
the glass transition temperature is equal to or greater than about 115° C., determined by DSC analysis from a second heating ramp at a heating rate of 10° C./min.

26. The method of claim 24, wherein:
the diol component comprises from about 20 to 80 mole percent 1,4-cyclohexanedimethanol;
the diacid component comprises from about 60 to 90 mole percent 4,4'-biphenyl dicarboxylic acid or ester producing equivalent thereof;
the morphology is semicrystalline;
the glass transition temperature is equal to or greater than 120° C., determined by DSC analysis from a second heating ramp at a heating rate of 10° C./min; and
the melting temperature is less than or equal to 250° C., determined by DSC analysis from a second heating ramp at a heating rate of 10° C./min.

27. The method of claim 26, wherein:
the diol component comprises from about 30 to 70 mole percent 1,4-cyclohexanedimethanol;
the diacid component comprises from about 65 to 85 mole percent 4,4'-biphenyl dicarboxylic acid or ester producing equivalent thereof; and
the melting temperature is less than about 200° C., determined by DSC analysis from a second heating ramp at a heating rate of 10° C./min.

28. The method of claim 26, wherein:
the diol component comprises from about 30 to 70 mole percent 1,4-cyclohexanedimethanol;
the diacid component comprises from about 70 to 90 mole percent 4,4'-biphenyl dicarboxylic acid or ester producing equivalent thereof;
the glass transition temperature is equal to or greater than about 125° C., determined by DSC analysis from a second heating ramp at a heating rate of 10° C./min; and
the melting temperature is less than about 240° C., determined by DSC analysis from a second heating ramp at a heating rate of 10° C./min.

29. The method of claim 17, further comprising forming the copolyester into a shaped article.

30. The method of claim 29, further comprising forming the copolyester into a fiber, a nonwoven fabric, a film, or a molded article.

31. The method of claim 17, wherein the catalyst is selected from systems including one or more compounds of Ti, Ti/P, Mn/Ti/Co/P, Mn/Ti/P, Zn/Ti/Co/P, Zn/Al, Sb, and Sn.

32. The copolyester produced according to method of claim 17.

* * * * *